United States Patent
Kim et al.

(10) Patent No.: US 11,157,846 B2
(45) Date of Patent: Oct. 26, 2021

(54) SYSTEM AND METHOD FOR TRANSFORMING COMMUNICATION METADATA AND SENSOR DATA INTO AN OBJECTIVE MEASURE OF THE COMMUNICATION DISTRIBUTION OF AN ORGANIZATION

(71) Applicant: Sociometric Solutions, Inc., Boston, MA (US)

(72) Inventors: Taemie J. Kim, Palo Alto, CA (US); Michelle Slezak Bradbury, Andover, MA (US); Daniel Olguin Olguin, Washington, DC (US)

(73) Assignee: SOCIOMETRIC SOLUTIONS, INC., Boston, MA (US)

( * ) Notice: Subject to any disclaimer, the term of this patent is extended or adjusted under 35 U.S.C. 154(b) by 219 days.

(21) Appl. No.: 16/532,835

(22) Filed: Aug. 6, 2019

(65) Prior Publication Data

US 2020/0042928 A1   Feb. 6, 2020

Related U.S. Application Data

(60) Provisional application No. 62/715,104, filed on Aug. 6, 2018.

(51) Int. Cl.
*G06Q 10/00* (2012.01)
*G06Q 10/06* (2012.01)
(Continued)

(52) U.S. Cl.
CPC ... *G06Q 10/063114* (2013.01); *G06F 16/908* (2019.01); *G06F 16/9024* (2019.01);
(Continued)

(58) Field of Classification Search
None
See application file for complete search history.

(56) References Cited

U.S. PATENT DOCUMENTS 6,473,794 B1 * 10/2002 Guheen ............... H04L 41/22
709/223
7,130,807 B1 * 10/2006 Mikurak ............. G06Q 10/06
705/7.25
(Continued)

OTHER PUBLICATIONS

Hedlund, P. H. (1997). Tools for the systemic study of learning organizations (Order No. 9817149). Available from ProQuest Dissertations and Theses Professional. (Year: 1997).*
(Continued)

*Primary Examiner* — Gurkanwaljit Singh
(74) *Attorney, Agent, or Firm* — Hamilton, Brook, Smith & Reynolds, P.C.

(57) ABSTRACT

A method and system for transforming communication metadata and sensor data into an objective measure of the participant communication distribution of an organization is disclosed. Embodiments of the present disclosure enable the capturing communication data from phone, email, or other virtual means of communication to develop a complete objective model of a human network. Metadata is extracted from the captured communication data and the extracted communication metadata is analyzed by (i) calculating time spent on each activity or interaction (e.g., email, meeting, call, chat, conversation) for each participant; (ii) prioritizing activities and interactions for each participant; and (iii) building a pairwise adjacency matrix based on the attention time each participant spent communicating with each other participant. Based on the pairwise adjacency matrix, a visualization may be created illustrating the communication distribution of the participants throughout the organization.

20 Claims, 20 Drawing Sheets

(51) Int. Cl.
*H04L 29/08* (2006.01)
*G06F 16/908* (2019.01)
*G06F 16/901* (2019.01)
*G06Q 10/10* (2012.01)

(52) U.S. Cl.
CPC ..... *G06Q 10/06398* (2013.01); *G06Q 10/105* (2013.01); *H04L 67/12* (2013.01)

(56) References Cited

U.S. PATENT DOCUMENTS

| | | | | |
|---|---|---|---|---|
| 8,706,827 | B1* | 4/2014 | Noble | H04L 51/00 709/206 |
| 8,843,372 | B1* | 9/2014 | Isenberg | G10L 25/48 704/250 |
| 9,094,282 | B2* | 7/2015 | Richardson | G06Q 10/10 |
| 9,509,701 | B2* | 11/2016 | Wohlert | H04W 12/068 |
| 9,514,424 | B2* | 12/2016 | Kleinbart | G06Q 10/06 |
| 9,652,500 | B2 | 5/2017 | Grus et al. | |
| 10,049,336 | B2 | 8/2018 | Olguin Olguin et al. | |
| 10,944,870 | B1 | 3/2021 | Paiva | H04M 3/5166 |
| 2003/0212891 | A1* | 11/2003 | Evans | H04L 63/083 713/168 |
| 2004/0177002 | A1* | 9/2004 | Abelow | G06Q 30/02 705/14.19 |
| 2006/0181411 | A1* | 8/2006 | Fast | G01S 5/02 340/539.13 |
| 2007/0287473 | A1* | 12/2007 | Dupray | H04W 4/029 455/456.1 |
| 2011/0055309 | A1* | 3/2011 | Gibor | H04L 69/18 709/202 |
| 2011/0225293 | A1* | 9/2011 | Rathod | G06Q 20/384 709/224 |
| 2012/0137367 | A1* | 5/2012 | Dupont | G06F 21/00 726/25 |
| 2012/0278388 | A1* | 11/2012 | Kleinbart | G06Q 10/10 709/204 |
| 2012/0323690 | A1* | 12/2012 | Michael | G01C 21/3461 705/14.58 |
| 2013/0285855 | A1* | 10/2013 | Dupray | G01S 5/0278 342/451 |
| 2014/0058801 | A1* | 2/2014 | Deodhar | G06Q 10/0639 705/7.38 |
| 2014/0081637 | A1* | 3/2014 | Wren | H04M 3/569 704/246 |
| 2014/0249891 | A1* | 9/2014 | Olguin Olguin | G06Q 50/01 705/7.38 |
| 2014/0273847 | A1* | 9/2014 | Nixon | G05B 11/01 455/41.2 |
| 2015/0033305 | A1* | 1/2015 | Shear | G06F 21/6218 726/6 |
| 2015/0213563 | A1* | 7/2015 | Joyce | G06Q 10/06398 705/7.42 |
| 2016/0019490 | A1 | 1/2016 | Fuller et al. | |
| 2016/0034305 | A1* | 2/2016 | Shear | G06F 16/248 707/722 |
| 2016/0132046 | A1* | 5/2016 | Beoughter | G05B 19/4184 700/17 |
| 2017/0070513 | A1* | 3/2017 | Robertson | H04L 67/22 |
| 2017/0116552 | A1* | 4/2017 | Deodhar | G06Q 10/06316 |
| 2017/0235848 | A1* | 8/2017 | Van Dusen | G06F 30/20 705/12 |
| 2017/0315683 | A1* | 11/2017 | Boucher | G06F 3/0482 |
| 2019/0042988 | A1* | 2/2019 | Brown | G06F 16/9535 |
| 2019/0108221 | A1* | 4/2019 | Nelson | H04M 7/0012 |
| 2019/0108492 | A1* | 4/2019 | Nelson | G06F 40/186 |

OTHER PUBLICATIONS

Dilmaghani, R. B. (2010). On improving communication in emergency response at network and organizational levels (Order No. 3404612). Available from ProQuest Dissertations and Theses Professional. (Year: 2010).*

Stankovic-Rice, B. (2011). Social media strategies to advance organizational change (Order No. 3473384). Available from ProQuest Dissertations and Theses Professional. (Year: 2011).* https://developers.google.com/gmail/api/v1/reference/users/messages, retrieved from internet Nov. 25, 2019, (4 pages).

https://developers.google.com/google-apps/calendar/v3/reference/events, retrieved from internet Nov. 25, 2019, (19 pages).

https://technet.microsoft.com/en-us/library/jj687981.aspx, retrieved from internet Nov. 25, 2019, 1 page.

https://technet.microsoft.com/enus/library/jj721924.aspx, retrieved from internet Nov. 25, 2019, 6 pages.

* cited by examiner

FIG. 4A

| Email* | Alias* | Gender - M (male)/F (female)/O (other)/? (unknown)* | Is the participant a manager? (Y/N)* | Teams the participant manages (if a manager - leave blank if not a manager)* | Timezone* | Expected working Hours - start (ex. 9:00)* | Expected working Hours - end (ex. 18:00)* | Primary Team* | Badge Participant? (Y/N)* | Digital Participant? (Y/N)* |
|---|---|---|---|---|---|---|---|---|---|---|

FIG. 4B

| Secondary Team (Optional) | Role (Optional) | Seniority (Optional) - Use 1-5 for different management levels, or more levels if applicable | Performance Rating (Optional) - Ex. High, Medium, Low | Tenure/ Years at Company (Optional) | OPTIONAL |||||| 
|---|---|---|---|---|---|---|---|---|---|---|
| | | | | | Country (Optional) | State (Optional) | City (Optional) | Campus (Optional) | Building (Optional) | Floor (Optional) | Additional Location(s) for analysis (ex. Metropolitan Area, desk location, etc.) |

```
Sample configuration file for Exchange 365 downloader
Lines starting with # are comments
        #
# Mandatory Fields:
# from_date, # exchange_version,
# server_url,
# admin_username, # admin_password,
# admin_domain
# hash_salt
other settings are optional
``` from_date: store only messages: after this date from_date 03 Mar, 2016
to_date: store only messages before this date (optional) to_date 12 Dec, 2016 exchange_version: Dggt supports pulling data from Exchange2007 or Exchange2013
exchange_version Exchange2013 server_url: full URL to Exchange.asmx on Exchange server server_url
https: //outlook.office365.com/EWS/Exchange.asmx admin_username: username for the user who has access to each mailbox to be downloaded
admin_username email@example.com admin_password: password of admin_username account
**admin_password *passwordExample!*** admin_type: type of user (impersonation) or delegation) admin_type delegation admin_domain: domain name for admin_username admin_domain HUMANYZE hash_salt: ASCII or 256bit hex encoded salt accepted. Used when hashing data.
hash_salt  6030A24D7CE24F9B9DB368427318DD3A7EC43E5656ABD827EE653CD6A133FB8C
hash_iterations: The number of times DGGT will send data through the hashing algorithm
hash_iterations 1
hash_exlusions: list of properties to exclude from hashing (optional)
hash_exclusions_owner True
hash_exclusions_domain True#hash_exclusions_location True
client_directory: fully qualified path name for directory provided by the client to
store data files (optional)
*trailing backslash required* #client_directory
C:\Users

FIG. 16

```
Example configuration file for Skype SQL Data downloader

# Lines starting with # are comments

# Mandatory Fields:
# from_date,
# data_source
# initial_catalog,
# Integrated_security
# hash_salt

other settings are optional from_date: store only messages after this date from_date
01 Nov, 2016 to_date: store only messages before this date
to_date 01 NOV, 2016
data_source: The name of the data source that the LcSCDR database is in. Specified as
"ServerName\InstanceName" data_source
SKYPE1\SKYPEMONITOR initial_catalog: The name of the database we're accessing initial_catalog
LcsCDR username: of the user with access to LcSCDR database
user_id mydomain\StackAdmin password: password of the above account
password Pass.123
integrated_security: a boolean, should be False when specifying the User### Id and
password, True otherwise integrated_security True
hash_salt: ASCII or 256bit hex encoded salt accepted. Used when hashing data.
# hash_salt 6030A24D7CE24F9B9DB368427318DD3A7EC43E5656ABD827EE653CD6A133FB8C
hash_iterations: The number of times DGGT will send data through the hashing algorithm.

# hash_iterations 1
hash_exlusions: list of properties to exclude from hashing
# hash_exclusions_owner True
# hash_exclusions_domain True
client_directory: fully qualified path name for directory provided by the client to
store data files
*trailing backslash required*
# client_directory c:/users/someuser/Documents/
```

FIG. 17

Sample configuration file #
Mandatory fields:
from_date,
to_date,
key_path,
admin_email
hash_salt other settings are optional from_date: store only messages: after this date
from_date 14 May, 2917
to_date: store only messages before this date - must be at least two days before today
to_date 14 Jul, 2817 hash_salt: ASCII or 256bit hex encoded salt accepted. Used when hashing data. #hash_salt 6030A24D7CE24F9B9DB368427318DD3A7EC43E5656ABD827EE653CD6A133FB8C
hash_iterations: The number of times DGGT will send data through the hashing algorithm
hash_iterations 1
hash_exlusions: list of properties to exclude from hashing (optional)
**hash_exclusions_owner False hash_exclusions_domain False
hash_exclusions_location False** client_directory: fully qualified path name for directory provided by the client to store data files (optional) ### *trailing backslash required*
client_directory C:/Users/someUserName/Desktop/dggt_reports/ service account private key: fully qualified path name to credentials file key_path dggt_config_files/service_account_private_key.json admin_email: email of the G suite administrator who gave the service account domain wide access
admin_email email@example.com

FIG. 18

SYSTEM AND METHOD FOR TRANSFORMING COMMUNICATION METADATA AND SENSOR DATA INTO AN OBJECTIVE MEASURE OF THE COMMUNICATION DISTRIBUTION OF AN ORGANIZATION

RELATED APPLICATION

This application claims the benefit of U.S. Provisional Application No. 62/715,104, filed on Aug. 6, 2018. The entire teachings of the above application are incorporated herein by reference.

BACKGROUND

Historically, organization managers have been basing their employee management decisions off of tribal knowledge, industry "best practices," organizational charts and subjective employee surveys. Making decisions based on subjective information, anecdotal knowledge or gut instinct is no longer acceptable. Poor organizational health can cost organizations and companies millions of dollars by causing confusion among departments and roles, disrupting collaboration, and slowing down decision-making. There exists a need to objectively measure how members of an organization communicate and interact to enable organization managers to make data driven decisions.

SUMMARY

Sensing and modeling social network data within an organization can be of benefit to enhance productivity and workplace happiness. Embodiments of the present disclosure enable the capturing of phone, email, or other virtual means of communication to develop a complete objective model of a human network. Using this data-driven research approach, organization managers can understand how communication networks function within an organization. Understanding how participants and groups within an organization collaborate and interact can help optimize workflows, uncover potential communication gaps and bottlenecks, and increase productivity. By measuring collaboration patterns, organizations can get quick feedback on how process changes have improved teamwork and project delivery time.

Embodiments of the present disclosure overcome the shortcomings of the prior art by providing a communications measurement method, system, and computer program product. Embodiments enable the objective quantification of certain aspects of communication and collaboration (i.e., measurement of, for non-limiting example, attention time, effective inclusion, reconfigured work space return on investment, productivity levels, etc.) within an organization by integrating with existing communication systems. Embodiments of the present disclosure leverage behavioral science, organizational network dynamics, AI, and machine learning to help organizations make better decisions.

Aspects to the present disclosure embody improvements to data processing and computer technology that enable computers to objectively quantify and measure human communications and interactions in a manner that existing systems cannot. Embodiments of the present disclosure embody technical solutions to enable the efficient processing of large amounts of digital communication data through the targeted extraction of specific metadata. Further, in addition to the analysis of digital communications, some embodiments integrate physical system of sensors worn by members of the organization (i.e., individual participants) that measure physical communications and activity, which enables all communications and interactions (digital and physical) to be analyzed.

According to some embodiments, digital communication data may be captured from e-mail, calendar, and chat systems. In some embodiments, human communication and interaction may be measured using a sensor system that may include electronic environmental sensors and/or wearable electronic badges having a plurality of sensors to capture human behavior, such as the social sensing and behavior analysis system disclosed in U.S. Pat. No. 10,049,336 (herein incorporated by reference). In some embodiments, the electronic environmental sensors used to sense human communication and interaction may include Internet of Things (IoT) devices, such as room usage sensors that sense when a room or office is occupied by at least one person.

According to some embodiments, metadata may be extracted from the communication data and aggregated into a communications file and associated or linked with respective users (i.e., participants) in a participant file. This results in (1) a participant file which lists all the users whose communication and interaction data was measured or extracted, and (2) a communications file comprising all the extracted communication metadata organized by participant.

In some embodiments, both the participant list and the extracted communication metadata is encrypted and/or obfuscated to help protect the anonymity and privacy of the participants. For example, some embodiments may hash the participant list and the extracted communication metadata before the data leaves the organization's network.

In some embodiments, the extracted communication metadata and sensor data is analyzed by: (i) calculating time spent on each activity or interaction (e.g., email, meeting, call, chat, conversation) for each participant; (ii) prioritizing activities and interactions for each participant; and (iii) building a pairwise directional weighted adjacency matrix based on the attention time each participant spent communicating with each other participant. According to some embodiments, the pairwise directional weighted adjacency matrix may be utilized to create and display a visualization illustrating the communication distribution of the participants throughout the organization.

Embodiments of the present disclosure utilize data structures in an unconventional manner to improve data processing and analysis technology in order to enable computer systems to accurately and objectively measure communication distribution throughout an organization based on large amounts of data. In order to efficiently process such large amounts of data, specific metadata is targeted for extraction. Further, the extracted metadata is prioritized based on a defined priority order of communication types. Additionally, the prioritized and extracted metadata is analyzed using data structures (e.g., adjacency matrix) to enable computer and database systems to efficiently and effectively relate all of the communications of each individual to each other individual within in an organization. Thus, the inventive concepts of the present disclosure include specific elements and steps other than what is well-understood, routine, conventional activity in the field that provide improvements to computer and database technology as well as improvements to the related technical field of data analytics.

According to some embodiments, the data analytics may be performed by a Participant Analytics Platform that may include any of the following modules: workspace planning, diversity and inclusion, workload assessment, collaboration and delivery, teamwork and engagement, and regulatory and compliance risk. The work space planning module enables organization managers to understand the right configuration and ROI for reconfiguring work areas, allocate the right amount of meeting spaces and closed offices, and design common areas that promote unplanned communication. The diversity and inclusion module may calculate an organization's diversity and inclusion program's success, and enables organization managers to integrate employees, increase engagement, maximize retention, and measure how often employees are included in meetings and given management visibility.

The workload assessment module provides data-driven information and feedback that allows organization managers to understand participant's work-life balance, attract top talent, align hiring plans with workloads, adjust "meeting culture" behavior, and allocate budget efficiently. The collaboration and delivery module may present analytics to organization managers that enables them to mitigate risk, uncover potential communication gaps and bottlenecks between cross-functional teams, and optimize delivery and timelines.

The teamwork and engagement module enables the identification of leaders within the organization, aids in the retention of top performers and checks productivity levels. The regulatory and compliance risk module allows organization managers to identify early indicators of risky behavior, noncompliance, and unlawfulness, as well as map communication patterns, map how meeting space is used, and map where employees have casual interactions.

In at least one embodiment of the present disclosure, the present invention may be a computer implemented method comprising generating a participant list identifying a plurality of participants within an organization and capturing digital communication data for each of the plurality of participants. The at least one embodiment may further comprise extracting metadata from the captured communication data, and associating the extracted metadata with respective participants of the plurality of participants identified on the participant list, the extracted metadata being attributes of one or more pieces of communication data between participants. The at least one embodiment may further comprise analyzing the extracted metadata by: calculating time spent on each communication for each of the plurality of participants during a period of time; prioritizing the communications for each participant during the period of time based on communication type of each piece of communication data; determining, for each participant, attention time spent communicating with each other participant based on the prioritized communications from the participant to each other participant; and building a pairwise adjacency matrix based on the attention time each participant spent communicating with each other participant to generate and display visualization of the pairwise adjacency matrix illustrating communication distribution of the participants throughout the organization.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4A illustrates example data fields for a participant list (a logical structure in software) according to some embodiments.

FIG. 4B illustrates example data fields for a participant list (a logical structure in software) according to some embodiments.

FIG. 16 illustrates an example EXCHANGE configuration file employed in embodiments.

FIG. 17 illustrates an example SKYPE configuration file employed in embodiments.

FIG. 18 illustrates an example GOOGLE configuration file employed in embodiments.

DETAILED DESCRIPTION

A description of example embodiments follows.

Figure 1:
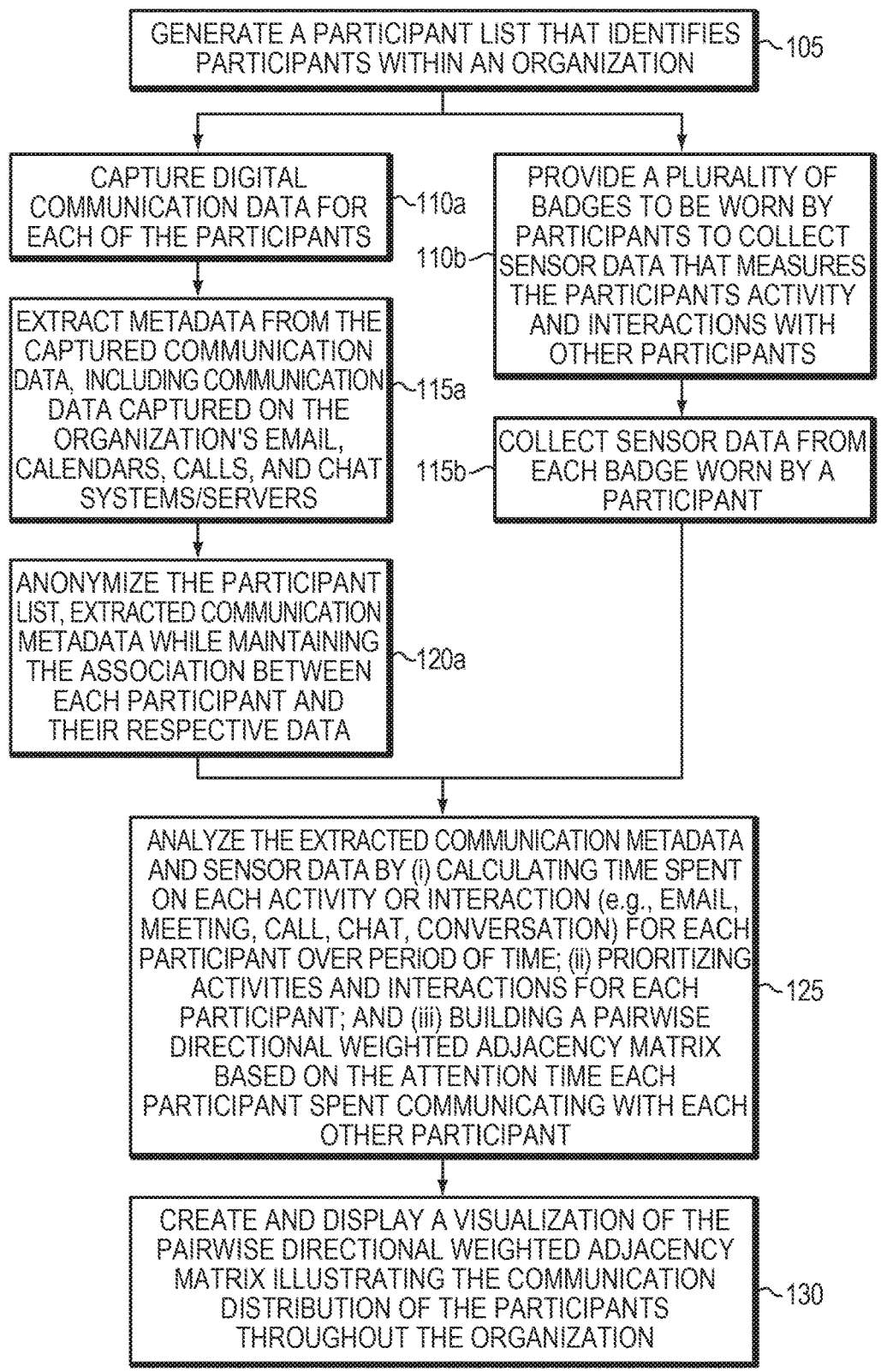
FIG. 1 is a block flow diagram of an example embodiment method for transforming communication metadata and sensor data into an objective measure of the communication distribution of an organization.

FIG. 1 is a block flow diagram of an example embodiment method 100 of the present disclosure. According to the example embodiment of FIG. 1, a participant list is generated 105 that identifies participants within an organization whose communications, interactions and activity will be analyzed. The participant list is a file logical structure in software comprising a list of unique user (participant) identifiers and attributes of the participants.

According to some embodiments, digital communication data is captured 110a for each of the participants. Digital communication data may include any type of digital data related to communications, meetings or interactions involving at least one of the participants. It should be understood that digital communication data may include communications, meetings, and interactions involving anyone the participants communicate with, including persons from outside the organization. For example, digital communication data may include any data related to email, calendars, meetings, calls and instant message chat sessions. The captured communication data may be stored on one or more servers connected to the organization's network 215, and/or one or more servers external to the organization's network 215.

In some embodiments, metadata is extracted 115a from the captured digital communication data. In some embodiments, step 115a extracts metadata from the underlying content of the communications (e.g., the body of an email, texts in a chat log, etc.) which content is not further used by method 100.

According to some embodiments, in addition to step 110a capturing digital communication data for each of the participants, one or more of the participants may be provided with wearable electronic badges (at 110b) that are worn by participants to collect senor data that measures the participants activity and interactions with each other. These wearable electronic badges may be part of a sensor system that includes wearable electronic badges having a plurality of sensors to capture human behavior, such as the social sensing and behavior analysis system disclosed in U.S. Pat. No. 10,049,336 (herein incorporated by reference in its entirety). The wearable electronic badges collect sensor data 115b from each participant wearing an electronic badge 110b, and that sensor data is associated with the respective participant's identifier in the participant list. Further, electronic environmental sensors may also be part of the sensor system that senses communication and interactions of the participants. Embodiments of the present disclosure may utilize both digital communication data and sensor data collected by the sensor system, or alternatively only one or the other.

According to some embodiments, the participant list, extracted communication metadata 115a and/or sensor data 115b may be anonymized in a manner that maintains the association between each participant on the participant list and their respective data at step 120a. The participant list and extracted communication metadata 115a may be anonymized by step 120a using techniques known in the art including, for example, hashing and hashing with a salt. In cryptography, a salt is random data that is used as an additional input to a one-way function that "hashes" data, a password or passphrase. In some embodiments, the collected sensor data 115b may also be anonymized in the same manner as the participant list and extracted communication metadata 115a.

According to some embodiments, the method proceeds with an analysis at step 125. In particular, step 125 analyzes the extracted communication metadata 115a and the collected sensor data 115b by (i) calculating attention time spent on each activity or interaction (e.g., email, meeting, call, chat, conversation) for each participant over period of time; (ii) prioritizing activities and interactions for each participant to deal with concurrent activities and interactions; and (iii) building a pairwise directional weighted adjacency matrix based on the attention time each participant spent communicating with each other participant.

According to some embodiments, the method at step 130 next creates and displays a visualization of the pairwise directional weighted adjacency matrix. The visualization generated at step 130 illustrates the communication distribution of the participants throughout the organization. The visualization enables objective quantification of human behavior within an organization and allows organization managers to understand how participants and groups within an organization collaborate and interact. The objective insight provided by the visualization at step 130 enables organization managers to optimize work-flows, uncover potential communication gaps and bottlenecks, and increase productivity. Existing human behavior analytic technology is unable to match the efficiency and performance of embodiments of the present disclosure at least because existing systems lack the inventive manner in which the present disclosure attributes attention time of participants to other participants directionally (e.g. splitting time for writing an email by the number of people the email is sent to). Further, the unconventional use of specific data structures, such as adjacency matrices, further improve over existing systems.

Figure 2:
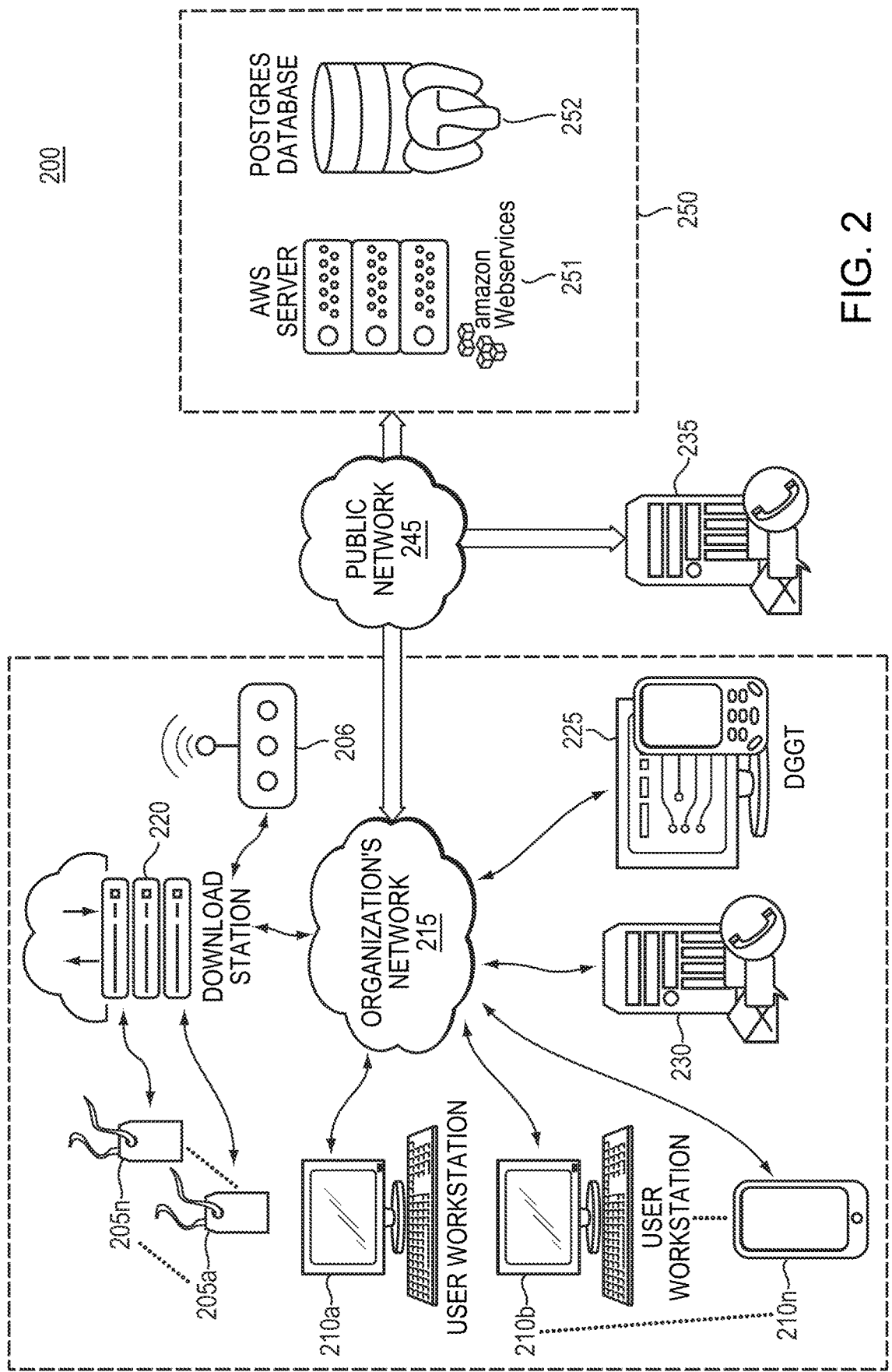
FIG. 2 is a schematic illustration of an example embodiment computer-based system that transforms communication metadata and sensor data into an objective measure of the communication distribution of an organization implementing the steps of the method of FIG. 1.

FIG. 2 is an illustration of a computer-based system 200 that transforms communication metadata and sensor data into an objective measure of the communication distribution of an organization implementing the steps of the method 100 of FIG. 1. Within an organization (e.g., employer work site, offices, and the like) a plurality of participants (i.e., members of the organization) may wear electronic badges 205a-n and/or use a plurality of devices 210a-n to communicate with each other (e.g., computers, mobile phones, tablets, etc.) over the organization's network 215 (e.g., local area network, private network, etc.). In some embodiments, an external sensor system, which may include wearable electronic badges 205a-n and/or electronic environmental sensors 206, is used to capture human communications and interactions.

The wearable electronic badges 205a-n may be the wearable electronic badges described in U.S. Pat. No. 10,049, 336. The wearable electronic badges 205a-n may collect sensor data that measures the participants activity and interactions with other participants. The wearable electronic badges 205a-n may be a smart I.D. card that measures activity in a workspace. For example, the wearable electronic badges 205a-n sensors may measure whether the participant is in motion or still, their proximity to other badged users and location beacons, whether the participant is talking or not talking, and the frequency and duration of in-person interactions.

The electronic environmental sensors 206 may include Internet of Things (IoT) devices, such as room usage sensors that sense when a room or office is occupied by at least one person.

After the electronic badges 205a-n and/or electronic environmental sensors 206 collect sensor data, the electronic badges 205a-n and/or electronic environmental sensors 206 may communicate that sensor data to one or more download stations 220 via a wired (e.g., ethernet-over-USB) or wireless connection. According to some embodiments, the download stations 220 may connect to the organization's network 215 and may utilize a virtual private network (VPN) to communicate the downloaded sensor data directly to the Participant Analytics Platform 250. Alternatively, in some embodiments, the download stations 220 may communicate the sensor data to the Digital Data Extraction Utility (DGGT) 225 through the organization's network 215.

According to some embodiments, one or more communication servers 230 connected to the organization's network 215 may capture digital communication data for each of the participants. The one or more communication servers 230 may include email servers, chat or instant message servers, and/or calling (e.g., VOIP calling) servers that are used by participants via the participants' electronic communication devices 210*a-n*. In some embodiments, one or more communication servers 235 capturing participant digital communication data may not be connected to the organization's network 215 and may instead be connected to a public network 245.

According to some embodiments, the DGGT 225 may extract specific metadata fields from the digital communication data captured on the one or more communication servers 230 (and/or 235) using API calls to query the data. The specific metadata fields may be extracted based on the participant list and a configuration file that defines which metadata fields are to be extracted from the digital communication data of each participant. In some embodiments, the DGGT 225 may also extract the sensor data from the download stations 220 and aggregate the sensor data with the extracted metadata for each participant. Alternatively, the download stations 220 may communicate the sensor data directly to the Participant Analytics Platform 250, where the Participant Analytics Platform 250 will aggregate the sensor data with the extracted metadata for each participant.

According to some embodiments, the DGGT 225 may anonymize the participant list, and extracted communication metadata (and sensor data) while maintaining the association between each participant and their respective data. In some embodiments, the participant list and extracted communication metadata is anonymized according to the given configuration file, and the anonymized data is sent to the Participant Analytics Platform 250 via secure connection (e.g., a VPN or secure FTP) through the public network 245.

According to some embodiments, the Participant Analytics Platform 250 analyzes the extracted communication metadata and collected sensor data in order to develop an objective model of the communication distribution in the organization. In some embodiments, the analysis may include: (i) calculating amount of time spent on each activity or interaction (e.g., email, meeting, call, chat, conversation) for each participant; (ii) prioritizing activities and interactions for each participant; and (iii) building a pairwise directional weighted adjacency matrix (stored in computer memory as a logical data structure) based on the attention time each participant spent communicating with each other participant and other correspondents that may not part of the organization. In some embodiments, the pairwise directional weighted adjacency matrix may be based on groups (i.e., teams within the organization, or groups of correspondents outside of the organization) of participants instead of individual participants. In the latter case, the pairwise directional weighted adjacency matrix would represent the interaction and communication between groups of participants and other correspondents instead of between individual participants and individual other correspondents.

According to some embodiments, the Participant Analytics Platform 250 may use the pairwise directional weighted adjacency matrix to create and display a visualization illustrating the communication distribution of the participants (or groups of participants) throughout the organization.

Figure 3:
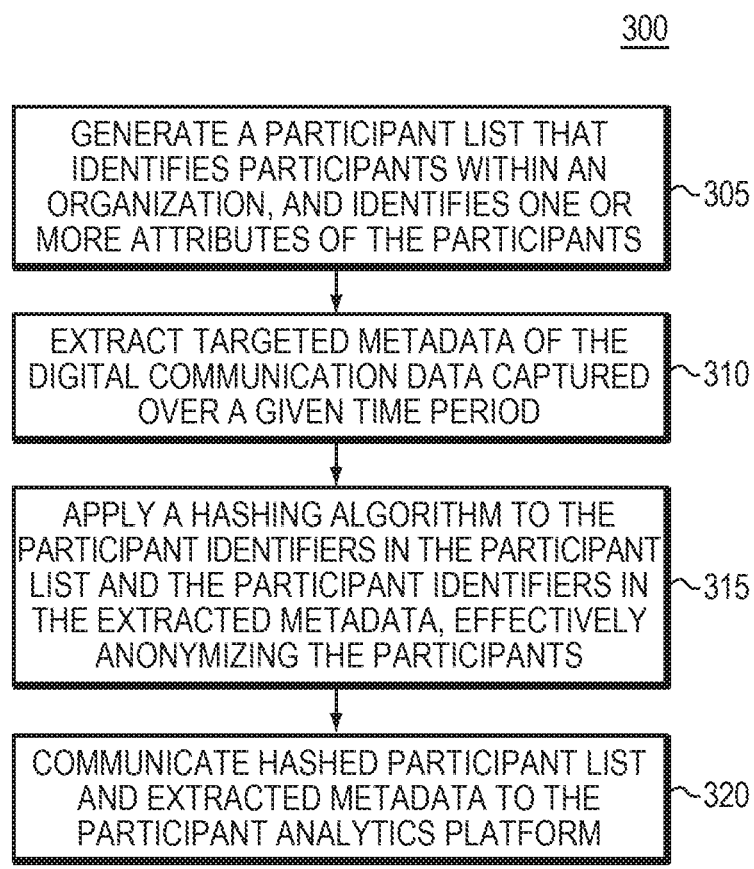
FIG. 3 is a block flow diagram of an example embodiment method of collecting the digital communication data and extracting targeted metadata.

FIG. 3 is a block flow diagram of an example embodiment method 300 for collecting the digital communication data and extracting targeted metadata. According to some embodiments, a member of the organization may generate a participant list that identifies participants within an organization, and identifies one or more attributes of the participants 305. FIG. 4A and FIG. 4B illustrate example data fields for a participant list according to some embodiments. In some embodiments, the example data fields of FIG. 4A are mandatory and the example data fields of FIG. 4B are optional. These example fields provide information regarding each participant that may be useful for analytics performed by the Participant Analytics Platform 250.

Referring back to FIG. 3, according to some embodiments, the DGGT 225 may extract targeted metadata of the digital communication data captured over a given period of time (e.g., digital communication data captured for a day, a week, a year, etc.) 310. While some embodiments of the DGGT 225 may extract the content of the communications and interactions to be analyzed, preferably only metadata is extracted. Extracting specific metadata, as opposed to the actual content of the communications, drastically reduces the amount of data that needs to be measured and analyzed in addition to assuaging privacy concerns of organizations and individuals. For example, measuring and extracting all communication content (e.g., all face-to-face conversation content, all email content including the subject line and body of emails, and all text messages) may result in over 100 MB of data per person per day. With all of this data, it is difficult to extract communication patterns, and would require a prohibitive amount of computational processing for a, at best, negligible increase in the accuracy of the analysis. Thus, measuring and extracting the underlying content of the communications is generally extraneous and unnecessary.

The specific fields to be extracted from the underlying digital communication data depends on the type of data itself. For example, the DGGT 225 may extract one or more of the following metadata fields from emails of each participant: DateTimeSent; DateTimeRecieved; Importance; Sensitivity; InReplyTo; ConversationId; Size; HasAttachments; Sender; BccRecipients; ToRecipients; CcRecipients; InternetMessageId; Culture; and IsDraft.

In some embodiments, the DGGT 225 may extract one or more of the following metadata fields from calendar data or meeting data of each participant: RequiredAttendees; OptionalAttendees; Location; Start; End; IsMeeting; IsOnlineMeeting; IsAllDayEvent; MyResponseType; Organizer; DateTimeSent; DateTimeReceived; InReplyTo; ICalUid; ConversationId; Importance; Sensitivity; HasAttachments; Size; IsRecurring; Recurrence; and Culture.

In some embodiments, the DGGT 225 may extract one or more of the following metadata fields from VOIP calling data of each participant: SessionIdTime; SessionIdSeq; InviteTime; FromUri; ToUri; EndTime; FromMessageCount; ToMessageCount; ToClientVersion; CorrelationId; ResponseTime; IsFromInternal; IsToInternal; Media; MediaStartTime; and MediaEndTime.

In some embodiments, the DGGT 225 may extract one or more of the following metadata fields from instant message data of each participant: ConversationId; DateTimeSent; Sender; ToRecipients; and Body. In some embodiments, the body of the messages may be pulled for the purpose of extracting the number of messages and sender within a single conversation thread. The statistics may be extrapolated in the DGGT 225, and the body of the subject message is not written to the data communicated to the Participant Analytics Platform 250. The capture of this data is also configurable within the DGGT 225 and can be optional.

According to some embodiments, the DGGT 225 may utilize application programing interface (API) calls to extract the various metadata fields from the one or more communication servers (230 and 235) capturing the underlying digital communication data. The API calls are specific to the type of server (e.g., MICROSOFT EXCHANGE server, GSUITE/GOOGLE server, SKYPE server). Listed below are specific API calls for types of communication servers that embodiments of the present disclosure may utilize. Example configuration files using API calls, extracting metadata fields, and hashing the participant identifiers in the participant list and metadata are also described below with respect to FIGS. 16, 17, and 18.

Referring back to FIG. 3, according to some embodiments, the DGGT 225 may apply a hashing algorithm to the participant identifiers in the participant list and the participant identifiers in the extracted metadata to anonymize 315 the participants. For example, in some embodiments the DGGT 225 may hash the participant list and the extracted communication metadata before the data leaves the organization's network 215. According to some embodiments, through configuration, DGGT 225 allows users the option to provide the salt used by the hashing algorithm to anonymize 315 the data prior to sending the extraction files to the Participant Analytics Platform 250. In order for Participant Analytics Platform 250 to provide accurate analytics, it requires a connection between the participants and the extracted metadata and/or sensor data. In other words, the connections (associations) between the participants and their respective extracted metadata and/or sensor data must be maintained after hashing.

In some embodiments, the DGGT 225 may communicate 320 hashed participant list and extracted metadata and/or sensor data to the Participant Analytics Platform.

Figure 5:
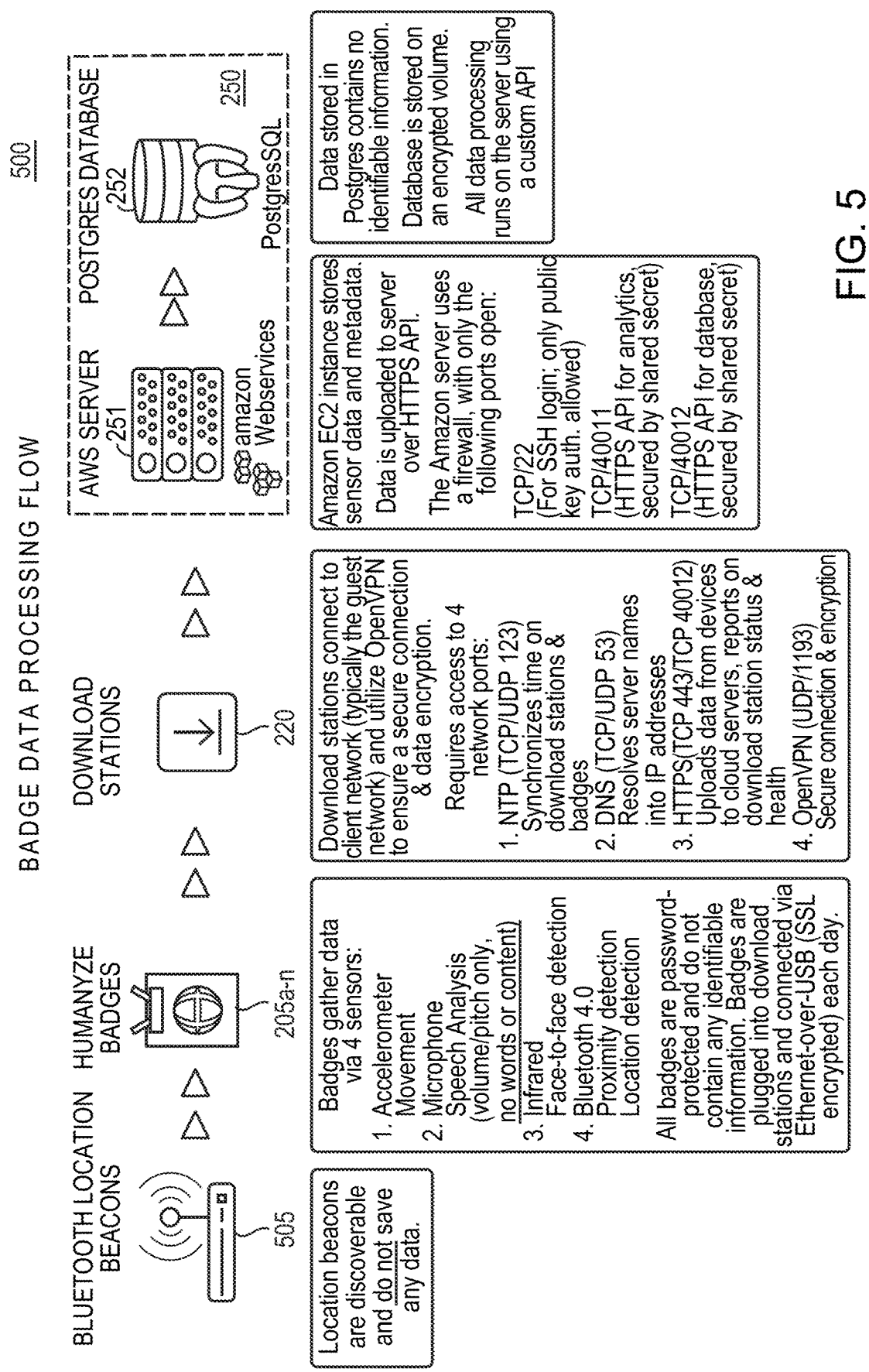
FIG. 5 is a block flow diagram of an example embodiment method of collecting and preparing sensor data collected by electronic badges worn by participants.

FIG. 5 is a block flow diagram of an example embodiment method 500 for collecting and preparing the badge sensor data. As stated above, the system and method of measuring participant activity and interactions is fully described in U.S. Pat. No. 10,049,336 (herein incorporated by reference in its entirety), however a summary of the badge data processing flow is also described here for convenience. According to some embodiments, location beacons 505 (e.g., BLUETOOTH or wireless communication location beacons) may be placed strategically in different locations throughout the organization premises. For example, the location beacons 505 may be placed throughout an office floor in areas such as meeting rooms, break areas, and internal offices. In some embodiments, the location beacons 505 may not store data, and instead only communicate with the electronic badges 205a-n to identify to the electronic badges 205a-n their current location within the organization premises.

According to some embodiments, the electronic badges 205a-n gather data via one or more sensors, which may include any of: (1) an accelerometer to detect movement, (2) a microphone to perform speech analysis (e.g., volume/pitch, speech patterns, talking time, and no words or content), (3) infrared for detection of when two or more badges are facing each other, and (4) Bluetooth for detecting the proximity to other badges and location detection via the location beacons 505.

In some embodiments, the electronic badges 205a-n may connect to one or more download stations 220. Download stations 220 may connect to the electronic badges 205a-n and/or the electronic environmental sensors 206 to download sensor data off of the badges 205a-n and/or the electronic environmental sensors 206, upload the obtained (collected) sensor data to the Participant Analytics Platform 250, charge the electronic badges 205a-n, and provide ongoing updates to the electronic badges 205a-n. In some embodiments, the download stations 220 may connect to the organization's network 215 and utilize a secure connection to communicate the sensor data to the Participant Analytics Platform 250. In some embodiments, the download stations 220 may utilize four network ports: (1) NTP (TCP/UDP 123) to synchronize time on download stations and electronic badges, (2) DNS (TCP/UDP) to resolve server names into IP addresses, (3) HTTPS (TCP 443/TCP 40012) to upload sensor data from the electronic badges to (cloud) servers and report on download station status and health, and (4) VPN (UDP/1193) to establish a secure connection and encryption.

According to some embodiments, the Participant Analytics Platform 250 receives the sensor data from the one or more download stations 220. In some embodiments, the Participant Analytics Platform 250 includes a web services server 251 (e.g., AMAZON web services (AWS) server that may store the sensor data. The web services server may provide software as a service (SaaS) cloud computing. The sensor data may be uploaded to the web services server 251 over HTTPS API. In some embodiments, the web services server 251 may use a firewall that leaves only the following ports open: (1) TCP/22 for SSH login, (2) TCP/40011 for the HTTPS API for analytics, secured by a shared secret, and (3) TCP/40012 for the HTTPS API for database, secured by a shared secret. The Participant Analytics Platform 250 may store the sensor data in a database 252 (e.g., a Postgres Database). In some embodiments, the sensor data stored in the database 252 may contain no personally identifiable information of the participants, and may store the sensor data on an encrypted volume. In some embodiments, the processing of the sensor data may run on the web services server 251 using a custom API. Other servers and databases are suitable.

According to some embodiments, the Participant Analytics Platform 250 receives the participant list with the metadata extracted from the digital communication data from the DGGT 225 and the sensor data from the download stations 220. The Participant Analytics Platform 250 uses the participant list, metadata extracted from the digital communication data, and the sensor data to perform analytics that apply behavioral science, organizational network dynamics, AI, and machine learning to present objective metric based information that helps organizations make better decisions. For example, historically, organizations, such as companies, have made workplace decisions based on organization charts and employee surveys. Now, with the people analytics supplied by the Participant Analytics Platform 250, companies have access to objective, complete data. Corporate communication metadata like email and call timestamps, number of chat messages sent, and duration of meetings can be measured to uncover patterns on how individuals and teams actually work (and thus objective measurements of levels of productivity, efficiency, an effectiveness of surroundings and people). The Participant Analytics Platform 250 may perform "organizational network analysis" (ONA), which helps organizations understand how information is shared to make more informed decisions, reduce costs, and optimize productivity.

Figure 6:
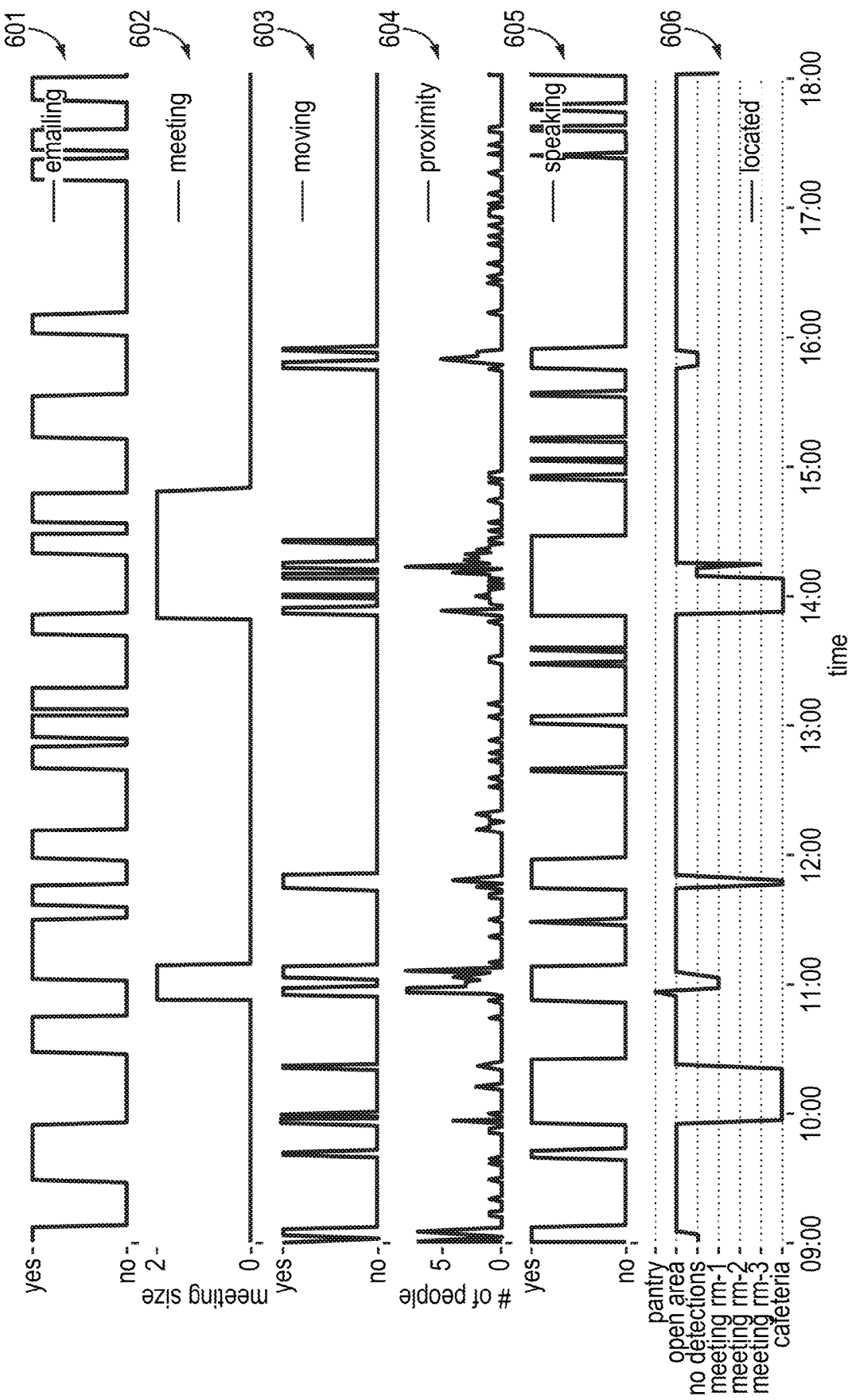
FIG. 6 is a communication and activity graph generated by an embodiment for an example workday for a participant.

FIG. 6 is a communication and activity graph for an example workday for a given participant. In some embodiments, the Participant Analytics Platform 250 may analyze the metadata extracted from the digital communication data and the sensor data to create the graphs illustrated in FIG. 6. The first graph 601 illustrates the amounts of time the participant spent emailing based on the metadata extracted from the email data. In some embodiments, the amounts of time a given participant spent emailing may be calculated by the Participant Analytics Platform 250 by assuming that the participant spent 10 minutes writing each email the given participant sent. This amount of time also accounts for email reading time, as there is no metric for determining email reading time from the metadata. The metadata does not record when the participant reads an email, or even whether or not the participant read the email. Thus, the default time of 10 minutes per email sent accounts for the time spent writing the email as participants tend to read and write emails at the same time. Of course, the default time of 10 minutes may be adjusted for different organizations and applications.

In some embodiments, the Participant Analytics Platform's calculation accounts for overlaps in time the participant spent writing an email. For example, if there was one email sent out at 2:00 pm, the default time estimate would assume that from 1:50 p-2:00 p the participant was writing that email. However, if another email was sent at 2:02 pm by the participant, the time allocated for writing the second email for the participant would only be 2 minutes (2:00-2:02) instead of the default time of 10 minutes. Therefore, even though time allocation is up to 10 minutes for writing a single email, the full 10 minutes is often not allocated during the calculation of email attention time.

The second graph 602 illustrates the amounts of time the given participant spent in meetings and the number of participants who attended the meeting based on the metadata extracted from appointment or calendar data. In some embodiments, the amounts of time spent attending meetings are calculated by making one or more of the following assumptions while analyzing the appointment or calendar metadata. In some embodiments, all meetings with only one participant total may be excluded from the analysis. Further, all meetings that are longer than 5 calendar days may be excluded from the analysis. The intent of this is to exclude projects from being analyzed as if the projects were continuous interactions. In some embodiments, all meetings that are longer than 12 hours are limited to be only during the normal work hours set per dataset (i.e., may be based on the work hours listed as an attribute of the participant in the participant list). For example, a meeting starting Monday 9:00 AM and ending Wednesday 11:00 AM is assessed as occurring during Monday 9:00 AM-6:00 PM, Tuesday 9:00 AM-6:00 PM, and Wednesday 9:00 AM-11:00 AM. For another example, a meeting starting Monday 7:00 AM and ending Monday 8:00 PM is treated in calculations as occurring during Monday 9:00 AM-6:00 PM.

In some embodiments, unless the meeting invite is explicitly declined, a participant is considered to have attended the meeting. In other words, responses such as tentative, unknown, or no response are all considered to have participated in the meeting.

According to some embodiments, overlapping meetings are accounted for by prioritizing the meeting that ended earlier. If the overlapping meetings end (within the 30-minute segment) at the same time, the meeting that has the earlier start (within the 30-minute segment) is prioritized relatively higher. If the overlapping meetings end and start at the same time, the meeting that has the shorter total duration is prioritized relatively higher. If the overlapping meetings have the same end time, start time, and total duration time, the meeting that has the smaller "meeting_{icaluid}" string is prioritized higher (i.e., the meeting or calendar event that was created first).

Participant Analytics Platform 250 calculates and generates the remaining graphs 603-606 illustrated in FIG. 6 by analyzing sensor data collected by the electronic badges 205*a-n*. The third graph 603 illustrates the amounts of time the given participant spent moving. The fourth graph 604 illustrates how many other participants the given participant was in the vicinity of at any given time during the example workday. The fifth graph 605 illustrates the amounts of time the given participant spent speaking. The sixth graph 606 illustrates the amounts of time the given participant spent at each location in the organization.

In some embodiments, the amounts of time the participant spent on calls may also be calculated and analyzed by comparing the mediastart metadata field to the mediaend metadata field to determine when the call started and ended, as well as the call's total duration.

In some embodiments, the amounts of time the participant spent sending and receiving instant message chats may also be calculated and analyzed by multiplying the number of messages in a chat session by 40 seconds for non-limiting example. In other words, the amount of time spent by a participant on an instant message chat session is determined as a function of number of involved messages, and in particular by the total number of messages multiplied by an amount of time estimated for each message.

Figure 7:
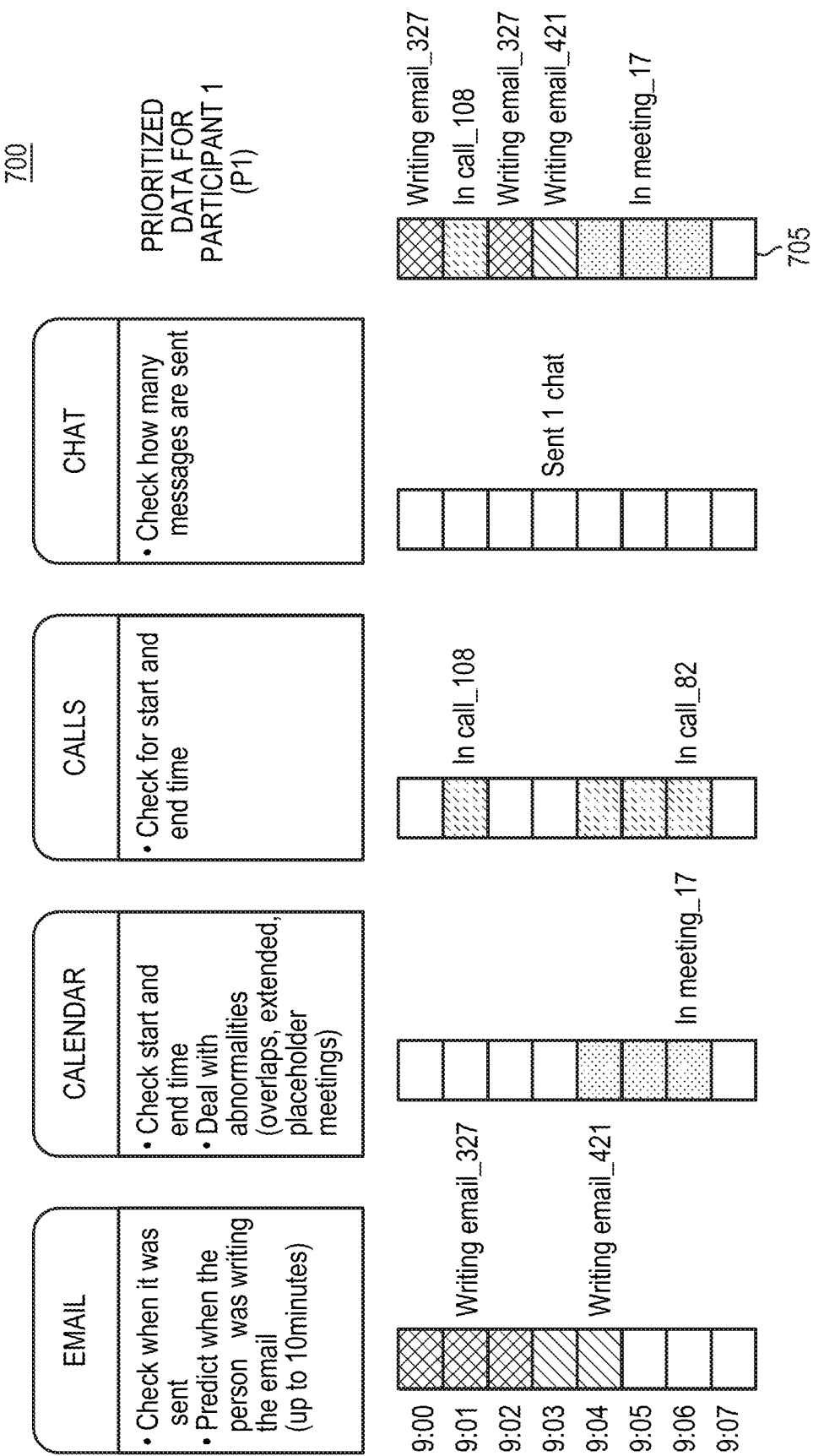
FIG. 7 is a flow diagram of an example method of prioritizing activities and interactions to account for concurrent activities and interactions of a participant in an embodiment.

FIG. 7 is a flow diagram illustrating an example method 700, according to some embodiments, for prioritizing activities and interactions to account for concurrent activities and interactions of a given participant. In some embodiments, after amount of time spent on each activity or interaction for each participant is calculated, the Participant Analytics Platform 250 prioritizes each participant's activities for a given time block (e.g., 9:00 AM to 9:07 AM as shown in FIG. 7) to determine the prioritized data of the participant for that time block 705. The example shown in FIG. 7 illustrates that the Participant Analytics Platform 250 calculated that the given participant was writing an email from 9:00 AM to 9:03 AM and was writing a second email from 9:03 AM to 9:05 AM. Further, the Participant Analytics Platform 250 calculated that the given participant was attending a meeting from 9:04 AM to 9:07 AM, the given participant was in a call at 9:01 AM and a second call from 9:03 AM to 9:07 AM, and the given participant sent 1 instant chat message.

According to some embodiments, the Participant Analytics Platform 250 determines a single prioritized activity and interaction time block (or time series represented in the system 250 and method 700) 705 for the participant according to a defined order of priority for the concurrent activities and interactions of the participant. In some embodiments, the order of priority of the activities may be (1) meetings, (2) calls, (3) emails, and (4) other communication types. In some embodiments, time spent on instant message chats is not affected by the prioritization because the time the instant messages are sent is unknown and is added into the participant's time amounts after the prioritization. Applying this order of priority results in the prioritized time block 705 for participant one (P1) shown in FIG. 7. The Participant Analytics Platform 250 stores calculated and determined time blocks 705 per participant in working memory or utilizes equivalent logical representations thereof.

Figure 8:
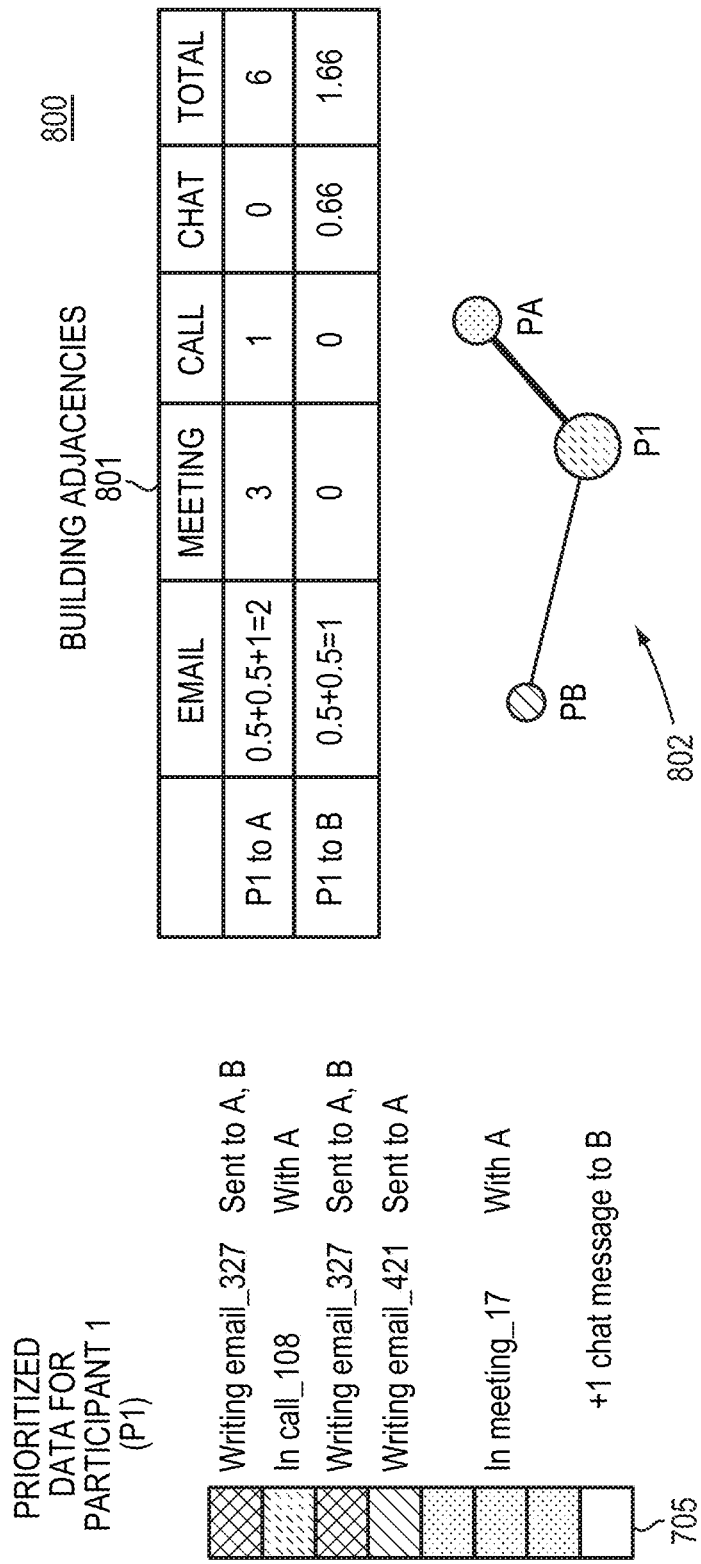
FIG. 8 illustrates in an embodiment an example method of building a pairwise directional weighted adjacency matrix based on the attention time each participant spent communicating with each other participant.

FIG. 8 illustrates an example method 800 of building a pairwise directional weighted adjacency matrix based on the attention time each participant spent communicating with each other participant, according to some embodiments.

Adjacency matrices may be used as data structures for the representation of graph data in computer programs for manipulating graphs and analyzing data. In some embodiments of the present disclosure, each row and each column of the adjacency matrix represents an individual participant. For example, row 1 and column 1 would represent Participant One (P1), and row 2 and column 2 would represent Participant A (PA). The value of any given entry in the adjacency matrix represents the amount of time the participant associated with the row spent communicating to the participant associated with the column. For instance, if P1 spent 10 minutes writing an email sent to PA the value of the entry (1,2) in the adjacency matrix for the email would be 10 (minutes). However, because the adjacency matrix is directional, the value of the entry (2,1) for the email would be 0 (minutes), as PA did not spend any time writing the email.

In some embodiments, the value of the entry for any given pairwise combination in the adjacency matrix represents the total attention time one participant spent communicating with another participant or other correspondent from outside the organization. The adjacency matrix may also be represented as a graph where the nodes represent participants (or other correspondents) and the edges represent attention time.

In some embodiments, the Participant Analytics Platform 250 may build an individual pairwise interaction adjacency matrix for a given time period based on the total attention time between each pair of participants (or other correspondents) for that given time period. Attention time is a representation of the amount of time spent communicating with one more participants divided by the number of participants (or other correspondents) that are part of the communication or interaction. For example, if Participant A has a 60-minute one-on-one meeting with Participant B, the combination (A,B) returns a value of 60 minutes. However, if A, B, C have a 60-minute meeting, then B had to share A's attention with C. Therefore, the combination (A,B) and the combination (A,C) would both return 30 minutes for the meeting.

According to some embodiments, the Participant Analytics Platform 250 may determine the value of each entry in the adjacency matrix using the prioritized data for each participant (discussed above in FIG. 7) and determining the attention time given to each other participant (or other correspondents) for the activities and interactions in the prioritized data. For example, FIG. 8 illustrates that the prioritized data for Participant One (P1) comprises 2 emails (email_327 and email_421), a call (call_108), a meeting (meeting_17) and 1 chat message. Based on the extracted metadata, the Participant Analytics Platform 250 is able to determine the other participants that were involved with the communications/interactions. Thus, the total attention time for each activity between each pair of participants (or other correspondents) is determined. For example, P1 spent 2 minutes writing email_327 which was sent to both PA and PB, and P1 spent 1 minute writing email_421 which was sent only to PA. Thus, for email, P1 spent 2 minutes of attention time on PA and 1 minute of attention time on PB. In some embodiments, emails sent to 100 or more participants may be excluded from consideration as their effect on attention time is minimal.

For meetings and calls there is no concept of sender and receiver, only co-attendees. According to the example of FIG. 8, P1 was in a meeting (meeting_17) with A for 3 minutes. Thus, for meetings, P1 spent 3 minutes of attention time on PA, and PA is also considered to have spent 3 minutes of attention time on P1. In some embodiments, meetings with over 50 participants attending are excluded from consideration. However, the effect is minimal as the attention time at a 50-person meeting is very small per pair.

Similarly, according to the example of FIG. 8, P1 was on a call (call_108) with A for 1 minute. Thus, for calls, P1 spent 1 minute of attention time on PA, and PA also is considered to have spent 1 minute of attention time on P1.

In some embodiments, attention time for chat messages is determined by the number of messages multiplied by 40 seconds and divided by the number of participants in the conversation less 1. Thus, the attention time for P1 for the chat session with B is (1 message times 40 seconds)/(2 participants−1)=0.66 attention minutes.

The attention time values for P1 to PA and P1 to PB are shown in table 801 in FIG. 8. These values may be inputted into an adjacency matrix that is used to render the graph 802 in FIG. 8. The same process may be used to build an adjacency matrix for groups (teams) participants instead of individuals. In this case, the communications between different groups of participants (or other correspondents) are aggregated and analyzed instead of communications and interactions between individual participants (or other correspondents).

According to some embodiments, the Participant Analytics Platform 250 may determine various metrics that are objectively representative of human interaction and activity within an organization. For example, the Participant Analytics Platform 250 may create a Participant Pairwise Interaction Adjacency Matrix to determine the communication distribution of individuals per day throughout the organization. This communication distribution metric returns the daily amount of interaction between two participants for each entry in the adjacency matrix or graph. In each edge, the first entry is the "from" and the second entry is the "to", the last entry is the amount of communication (attention time). If the amount of interaction between two participants is 0, a value is not returned. The attention time, in this case attention minutes, for each participant is calculated differently for each type of communication.

For email, the value assigned to the pair of participants is attention minutes spent by the sender (first entry in edge) to receiver (second entry in edge). For example, Participant A sends an email to Participant B, Participant C, and three other external people. The total time spent by Participant A writing the email is determined as explained above. For this example, 10 minutes is assumed. The total time spent writing the email (10 minutes) is divided by 5 (Participant B, Participant C+3 people). Therefore (A,B)=(A,C)=2 minutes, with (A, external)=6 minutes. Emails with 100 or more recipients may be excluded, as the attention time is minimal.

For meetings, the value assigned to the pair of participants is attention minutes spent by the participant where the two participants are both included. Both of the participants should not have declined the event. There is no concept of sender and receiver for meetings, only co-attendees. Therefore (A,B) (B,A) at all times. Meetings with 50 or more attendees may be excluded to limit the complexity of the query. However, the effect is minimal as the attention time at a 50-person meeting is very small per pair.

For calls, the value assigned to the pair of participants is attention minutes spent by the participant where the two participants are both included. There is no concept of sender and receiver for calls, only co-attendees. Due to prioritization of communications activities, calls that overlap a meeting event are ignored.

For instant message chats, the value assigned to the pair of participants is attention minutes spent by the participant where the two participants are both included. There is normally no metadata for the exact timing on when a chat occurs, however there is metadata describing the number of messages a participant sent. Therefore, the time spent on a chat session is estimated by the number of messages times 40 seconds and divided by the number of recipients on the session minus the participant.

In some embodiments, the Participant Analytics Platform 250 includes in the adjacency matrix interactions and communications detected by the electric sensors and determined from the sensor data. For example, wearable electric badges may detect face-to-face interactions between two or more participants. While the electric badges are detecting a face-to-face interaction, the badges may also detect whether or not the participant is speaking. Thus, the Participant Analytics Platform 250 is able to determine how long two participants were face-to-face and if they were speaking. If the face-to-face interaction was not accounted for during a scheduled meeting, then the Participant Analytics Platform 250 may include the attention time that the participants gave each other as co-attendees into the adjacency matrix. If a 10-minute face-to-face interaction between PA and PB (not during a scheduled meeting including PA and PB) is determined from the sensor data, the Participant Analytics Platform 250 may allocate the attention time as (PA, PB)=10 minutes=(PB, PA). If a 10-minute face-to-face interaction between PA, PB and PC (not during a scheduled meeting including PA, PB and PC) is determined from the sensor data, the Participant Analytics Platform may allocate the attention time as (PA, PB)=(PA, PC)=5 minutes.

According to some embodiments, each communication medium (email, meetings, calls, chats, face-to-face interaction, etc.) may be used to build a separate adjacency matrix or all aggregated in a single adjacency matrix for total attention time spent for all communication mediums.

According to some embodiments, to build the adjacency matrix the following data is utilized: participant list; email: From, To/CC/BCC, Sent, MessageID; calendar: From/TO/CC/BCC, Start, End, ICalUID; chat: msg_from, msg_to, mediastarttime, mediaendtime, tomsgcount, frommsgcount, conversationid; call: msg_from, msg_to, mediastarttime, mediaendtime, conversationid; and sensor data.

Below is an example code for an adjacency matrix generated based only on emails for an organization that has 11 people. The nodes are the active participants and the edges represent the communications in the format (from, to, attention minutes). According to some embodiments, the Participant Analytics Platform 250 converts the analytics payload into an API payload and then to a dashboard visualization such as FIG. 9. Below is an example analytics payload and an API payload.

---

Analytics Payload Format (Participant IDs hashed):

dcoll_communication_patterns_email
{u'edges': [[u'07d728aa-6337-4adc-81e8-b843317592c4',
u'095ed6e8-469d-4bc2-
b401-37b9eb89d49b', 31],
    [u'07d728aa-6337-4adc-81e8-b843317592c4',
    u'ed12d41b-d172-4453-

-continued a5b3-54d4a69817a7', 24],
    [u'07d728aa-6337-4adc-81e8-b843317592c4',
    u'e885ea25-ee56-46c2-
b4b6-e70f3438b8d4', 27],
    [u'07d728aa-6337-4adc-81e8-b843317592c4',
    u'4eac11cc-6e77-4ea5-
a542-41e6e6f738c2', 19],
    [u'07d728aa-6337-4adc-81e8-b843317592c4',
    u'ba322927-0ac7-49ee-
b405-f67c582cfd04', 31]],
  u'nodes': [u'07d728aa-6337-4adc-81e8-b843317592c4',
        u'095ed6e8-469d-4bc2-b401-37b9eb89d49b',
        u'4eac11cc-6e77-4ea5-a542-41e6e6f738c2',
        u'ed12d41b-d172-4453-a5b3-54d4a69817a7',
        u'67b2a675-a5fb-4b5e-87a5-fa24ba7ff9c2',
        u'e885ea25-ee56-46c2-b4b6-e70f3438b8d4',
        u'ba322927-0ac7-49ee-b405-f67c582cfd04' ,
        u'b4503865-56a6-456e-9c62-aee3c1476b00',
        u'987eb0cd-ab42-4b5e-9c55-e0521891e3a5',
        u'4eef43ad-c524-495c-b2d8-6e1a19b40331',
        u'6c75f669-aa61-4858-8707-e77206fda023']}

API Payload Format (Participant IDs not hashed):

Where node_type=participant:
{
    'nodes': [
        {
            'id': 221,
            'team_id': 60
        },
        {
            'id': 253,
            'team_id': 61
        },
        {
            'id': 234,
            'team_id': 60
        }, ...
    ]
    'edges': [
        {
            "to": 221,
            "from": 253,
            "weight": 31
        },
        {
            "to": 221,
            "from": 234,
            "weight": 24
        },
        {
            "to": 234,
            "from": 221,
            "weight": 27
        },
        {
            "to": 253,
            "from": 221,
            "weight": 19
        },
        {
            "to": 234,
            "from": 253,
            "weight": 31
        }, ...
    ]
}
Where node_type=team:
{
    'nodes': [
        {
            'id': 61
        },
        {
            'id': 60
        }, ...
    ]
    'edges': [
        {

```
        "to": 61,
        "from": 60,
        "weight": 19
    },
    {
        "to": 60,
        "from": 61,
        "weight": 62
    }, ...
    ]
}
```

Figure 9:
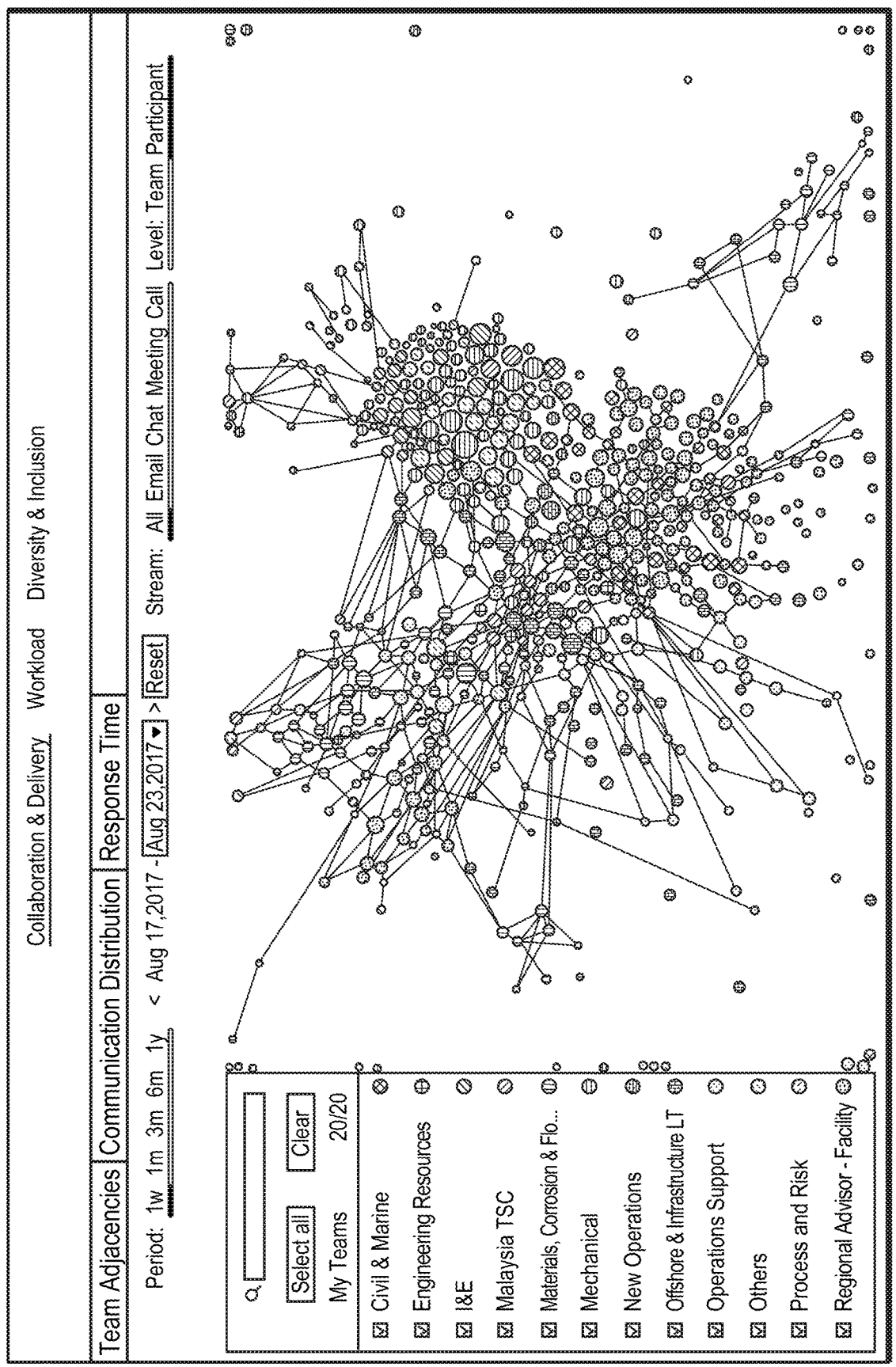
FIG. 9 depicts an example visualization of communication distribution between participants throughout an organization, according to embodiments of the present disclosure.

FIG. 9 depicts an example visualization of communication distribution between participants throughout an organization according to embodiments of the present disclosure. In some embodiments, the visualization depicted in FIG. 9 may be generated by the collaboration and delivery module of the Participant Analytics Platform 250. The nodes in the edge weighted graph represent participants and the edges represent communications and interactions between the participants. The larger the size of the node the greater the amount communication and interactions the respective participant had with other participants. Further, the distance between any two nodes represents that amount of communication and interaction between those respective participants; the shorter the distance the more communication and interaction. The nodes are also shaded (or may be color coded) to correspond to the team or group the participant represented by the node belongs to.

Similarly, the Participant Analytics Platform 250 may create a Team Pairwise Interaction Adjacency Matrix to determine the communication distribution of teams per day throughout the organization. In addition to the teams of participants, there may be two extra recipient groups that include the other correspondents the participants communicate with: "others_internal" and "others_external". The group "others_internal" include correspondents who are not in the participant list but have an email domain that is internal to the organization. The internal domains are defined by the organization. The group "others_external" include correspondents who are not in the participant list and have an email domain that is not internal to the organization.

In some embodiments, the attention time may be determined for all team-pairs and calculated per the communication medium or aggregated together. According to some embodiments, to build the team adjacency matrix the following data is required: the participant list including each participants' primary team; email: From, To/CC/BCC, Sent, MessageID; calendar: From/TO/CC/BCC, Start, End, ICalUID; chat: msg_from, msg_to, mediastarttime, mediaendtime, tomsgcount, frommsgcount, conversationid; call: msg_from, msg_to, mediastarttime, mediaendtime, conversationid; and sensor data.

Below is an example code for a team adjacency matrix generated based on three participant teams and two additional recipient teams. The nodes are the teams and the edges represent the communications in the format (from, to, attention minutes). According to some embodiments, the Participant Analytics Platform 250 converts the analytics payload into an API payload and then to a dashboard visualization such as FIG. 10. Below is an example analytics payload and an API payload.

Analytics Payload Format

```
dcoll_team_adjacencies_email
{u'edges': [[u'Analytics', u'Business', 24],
            [u'Analytics', u'TechDC', 27],
            [u'Business', u'TechDC', 31],
            [u'Business', u'others_internal', 71],
            [u'Business', u'others_external', 131],
            [u'Analytics', u'others_internal', 35],
            [u'Analytics', u'others_external', 32]],
 u'nodes': [u'TechDC'
            u'Analytics',
            u'Business',
            u'others_internal',
            u'others_external']}
```

API Payload Format

```
dcoll_team_adjacencies_email
{
    "data": {
        "nodes": [
            {
                "id": 60
            },
            {
                "id": 61
            },
            {
                "id": 300
            },
            {
                "id": "others_internal"
            },
            {
                "id": "others_external"
            }
        ],
        "edges": [
            {
                "from": 60,
                "to": 300,
                "weight": 31
            },
            {
                "from": 60,
                "to": "others_internal",
                "weight": 71
            },
            {
                "from": 60,
                "to": "others_external",
                "weight": 131
            },
            {
                "from": 61,
                "to": 60,
                "weight": 24
            },
            {
                "from": 61,
                "to": 300,
                "weight": 27
            },
            {
                "from": 61,
                "to": "others_internal",
                "weight": 35
            },
            {
                "from": 61,
                "to": "others_external",
                "weight": 32
            }
        ]
    }
}
```

Figure 10:
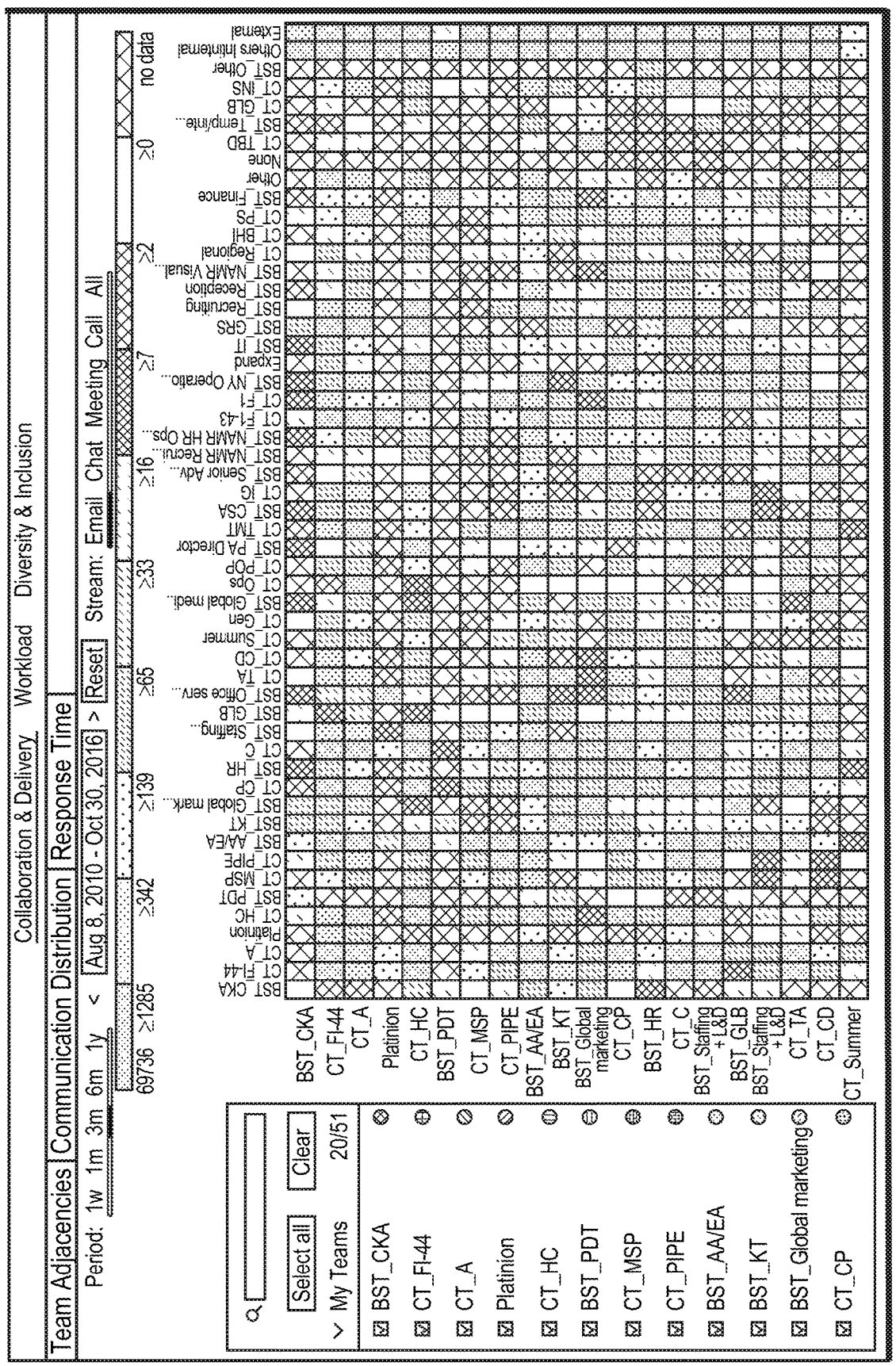
FIG. 10 depicts an example visualization of an adjacency matrix illustrating communication distribution between teams within an organization, according to embodiments of the present disclosure.

FIG. 10 depicts an example visualization of an adjacency matrix illustrating communication distribution between teams within an organization according to embodiments of the present disclosure.

According to some embodiments, the Participant Analytics Platform 250 may determine the total time that a participant spends on each communication medium over a given period of time (e.g., day, week, month, etc.) In some embodiments, the Participant Analytics Platform 250 may calculate the amount of time spent communicating on each medium as described above. Additionally, in some embodiments, the Participant Analytics Platform 250 may calculate the time the participant is not involved with communicating with other people. The "no_communication" time is calculated by subtracting all the minute segments the participant spent on any communication medium from the work day duration of the participant. This results with the "no_communication" time for that participant. In some embodiments, the work day duration of the participant is an attribute of the participant stored in the participant list ("Expected Working Hours—Start" and "Expected Working Hours—End") as shown in FIG. 4A.

According to some embodiments, the Participant Analytics Platform 250 determines the total time that a participant spends on each communication medium over a given period of time using the following data: participant list; email: From, To/CC/BCC, Sent, MessageID; calendar: From/TO/CC/BCC, Start, End, ICalUID; chat: msg_from, msg_to, mediastarttime, mediaendtime, tomsgcount, frommsgcount, conversationid; call: msg_from, msg_to, mediastarttime, mediaendtime, conversationid; and sensor data. In some embodiments, the analysis returns a single dictionary that has info on the amounts of time spent on all communication media (time spent on email, time spent on chat, time spent on meetings, time spent on calls (not meetings), time spent on face-to-face interactions, and estimated time not involved in communication during normal work hours) for each of during work, during after-work, overall.

Figure 11:
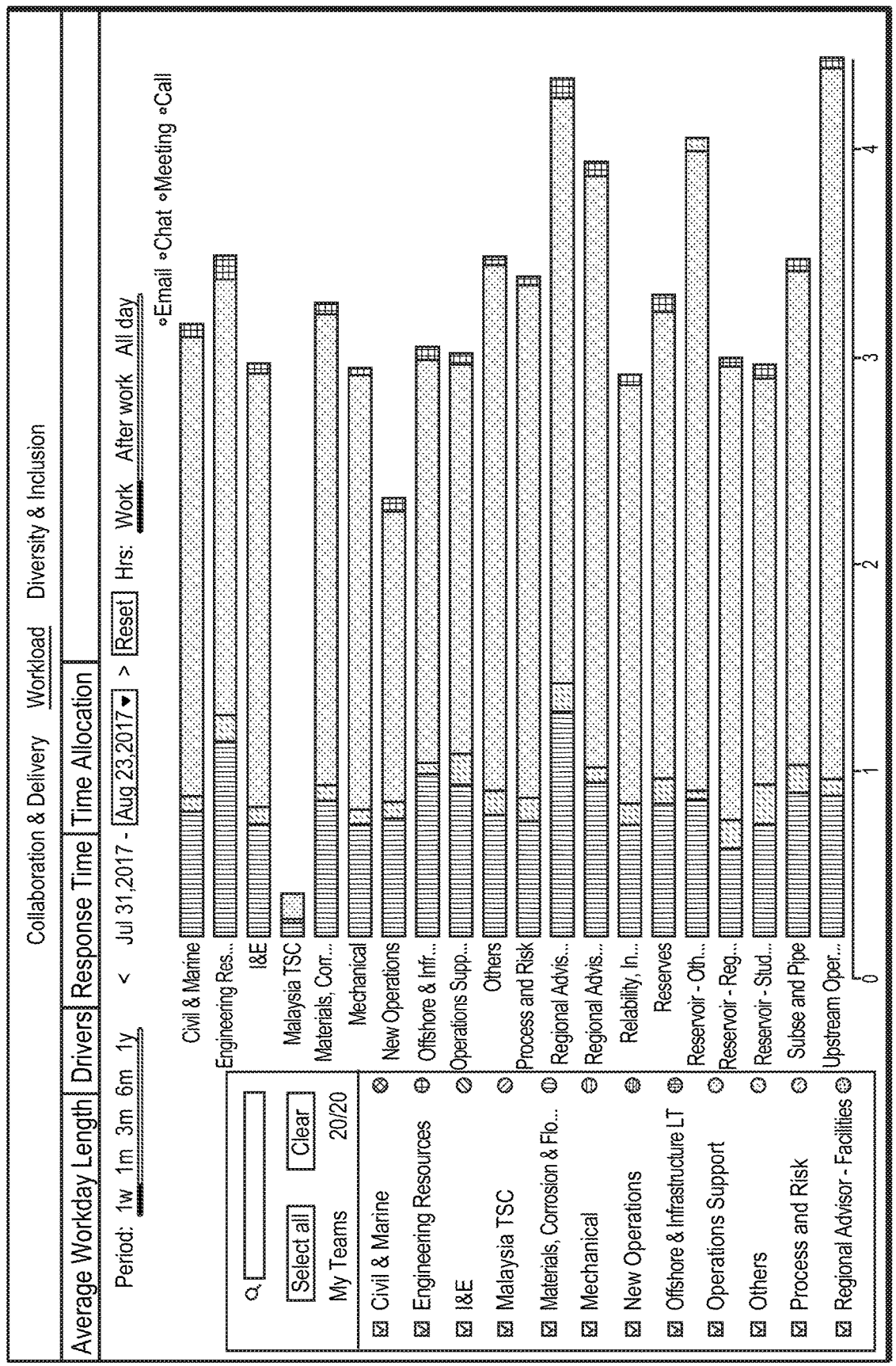
FIG. 11 depicts an example visualization illustrating the amount of time different teams of participants spend communicating on email, chats, meetings and calls, according to embodiments of the present disclosure.

According to some embodiments, the Participant Analytics Platform 250 converts the analytics payload into an API payload and then to a dashboard visualization such as FIG. 11. Below is an example analytics payload and an API payload.

---

Analytics Payload Format:

```
{"work_email": 123,
 "work_callnomeeting": 30,
 "work_chat": 25,
 "work_meeting": 180,
 "work_face_to_face": 20,
 "work_nocommunication": 240,
 "afterwork_email": 0,
 "afterwork_callnomeeting": 0,
 "afterwork_chat": 0,
 "afterwork_meeting": 0,
 "afterwork_face_to_face": 0,
 "afterwork_nocommunication": 0,
 "overall_email": 123,
 "overall_callnomeeting": 30,
 "overall_chat": 25,
 "overall_meeting": 180,
 "overall_face_to_face": 20,
 "overall_nocommunication": 240}
```

API Payload Format:

```
{
  'data': [
    {
      'model_name': 'benchmarkgroup',
      'record_id': 60,
      'label': 'Business',
      'values': {
        'work': {
          'callnomeeting': 5.96,
          'email': 16.6,
          'chat': 16.6,
          'meeting': 9.79,
          'face_to_face': 5.5,
          'nocommunication': 9.79
        },
        'afterwork': {
          'callnomeeting': 19.61,
          'email': 17.74,
          'chat': 17.74,
          'meeting': 7.14,
          'face_to_face': 3.5,
          'nocommunication': 7.14
        },
        'overall': {
          'callnomeeting': 16.27,
          'email': 4.54,
          'chat': 4.54,
          'meeting': 6.8,
          'face_to_face': 1.5,
          'nocommunication': 6.8
        }
      }
    },
    {
      'model_name': 'benchmarkgroup',
      'record_id': 61,
      'label': 'Analytics',
      ...
    }
  ],
  'metadata': {
    'key': 'dover_time_allocation',
    'start_date': '2017-02-01',
    'end_date': '2017-02-28'
  }
}
```

---

FIG. 11 depicts an example visualization illustrating the amount of time different teams of participants spend communicating on email, chats, meetings, and calls, according to embodiments of the present disclosure. The type of visualization may be displayed for individual participants or for groups of participants as shown in FIG. 11.

According to some embodiments, the Participant Analytics Platform 250 may determine the engagement of a participant with other groups of participants (e.g., mangers and non-managers, external persons and internal persons, male participants and female participants, etc.). The Participant Analytics Platform 250 may also determine the overall engagement between groups of participants. For example, the Participant Analytics Platform 250 may determine the overall engagement balance between managers and non-managers based on emails, chats, meetings, and calls.

In some embodiments, the Participant Analytics Platform 250 calculates the number of attention minutes each participant spends with managers and non-managers. If there was an event that included both managers and non-mangers the attention minutes will be divided (e.g., a 60 minutes meeting with 2 managers and 1 non-manager will count as 40 minutes with managers and 20 minutes with non-managers). The attention minutes for each communication medium is calculated as explained above.

According to some embodiments, the Participant Analytics Platform 250 determines the total time that a participant spends communicating with managers and non-managers using the following data: participant list: manager/nonmanager; email: From, To/CC/BCC, Sent, MessageID; calendar: From/TO/CC/BCC, Start, End, ICalUID; chat: msg_from, msg_to, mediastarttime, mediaendtime, tomsgcount, frommsgcount, conversationid; call: msg_from, msg_to, mediastarttime, mediaendtime, conversationid; and sensor data. Additionally, the Participant Analytics Platform 250 may determine gender balance between communication with managers and non-managers. In some embodiments, this may be analysis performed with the diversity and inclusion module of the Participant Analytics Platform 250. To determine the gender balance, the Participant Analytics Platform 250 may also utilize the gender attribute of the participants on the participant list. As such, for example, the Participant Analytics Platform 250 is able to determine how many minutes female non-managers spend with managers and how many minutes male non-managers spend with managers.

Figure 12:
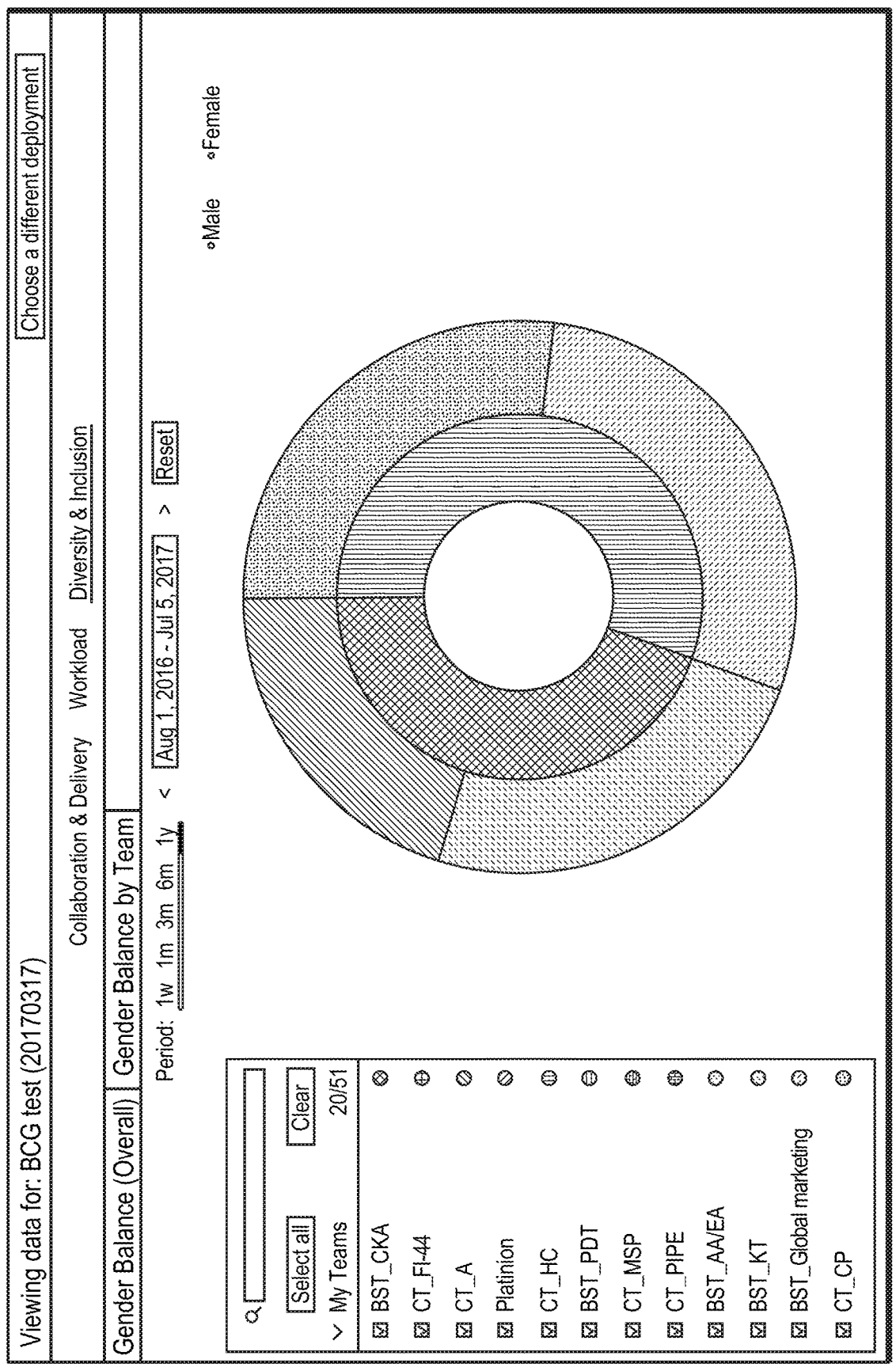
FIG. 12 depicts an example visualization illustrating the overall gender balance of different teams within an organization, according to embodiments of the present disclosure.

According to some embodiments, the Participant Analytics Platform 250 converts the analytics payload into an API payload and then to a dashboard visualization such as FIG. 12. Below is an example analytics payload and an API payload.

---
Analytics Payload Format:

dover_communication_volume_email per person
{"all":135,
"manager":35,
"nonmanager":100}
API_Payload_Format:

For aggregated values per team use /metrics_team_aggregate
{
    'data': [
        {
            'model_name': 'benchmarkgroup',
            'record_id': 60,
            'label': 'Business',
            'current_male_ratio': .625,
            'current_female_ratio': .375,
                'current_unknown_ratio': 0,
            'values': {
                'male': {
                    'all': .412,
                    'manager': .166,
                    'non_manager': .979
                },
                'female': {
                    'all': .588,
                    'manager': .834,
                    'non_manager': .021
                }
            }
        },
        {
            'model_name': 'benchmarkgroup',
            'record_id': 61,
            'label': 'Analytics',
            ...
        }
    ],
    'metadata': {
        'key': 'ddni_gender_balance_volume_email',
        'start_date': '2017-02-01',
        'end_date': '2017-02-28'
    }
}
For aggregated values to be mapped by all participants use
/metrics_participant_aggregate
{
    'data': {
        'male': .412,
        'female': .588
    },
    'metadata': {
---
-continued ---
        'key': 'ddni_gender_balance_volume_email',
        'start_date': '2017-02-01',
        'end_date': '2017-02-28'
    }
}
---

FIG. 12 depicts an example visualization created by the diversity and inclusion module of the Participant Analytics Platform that illustrates the overall gender balance of different teams within an organization according to embodiments of the present disclosure.

According to some embodiments, the Participant Analytics Platform 250 may determine the sources of work drivers during work hours, all day, and/or after work hours. In some embodiments, the Participant Analytics Platform 250 calculates the number of attention minutes each participant spends with managers, non-managers, and external persons, as well as whether the attention minutes were spent during work hours or after work hours. For example, the following metrics may be determined:

overall_external: overall communication volume that includes at least one external person;

overall_manager: overall communication volume that is within internal people only, and includes at least one manager;

overall_nonmanager: overall communication volume that is within internal people only, and includes no manager;

work_external: communication volume that occurred during the normal working hours that includes at least one external person;

work_manager: communication volume that occurred during the normal working hours that is within internal people only, and includes at least one manager;

work_nonmanager: communication volume that occurred during the normal working hours that is within internal people only, and includes no manager;

afterwork_external: communication volume that occurred outside the normal working hours that includes at least one external person;

afterwork_manager: communication volume that occurred outside the normal working hours that is within internal people only, and includes at least one manager; and afterwork_nonmanager: communication volume that occurred outside the normal working hours that is within internal people only, and includes no manager.

According to some embodiments, the following data is utilized: participant list: manager/non-manager, internal domains, expected work hour start and end (default is 9 am to 6 pm), and time zone; email: From, To/CC/BCC, Sent, MessageID; calendar: From/TO/CC/BCC, Start, End, ICalUID; chat: msg_from, msg_to, mediastarttime, mediaendtime, tomsgcount, frommsgcount, conversationid; call: msg_from, msg_to, mediastarttime, mediaendtime, conversationid; and sensor data. The attention minutes for each communication medium is calculated as explained above.

According to some embodiments, the Participant Analytics Platform 250 converts the analytics payload into an API payload and then to a dashboard visualization. Below is an example analytics payload and an API payload.

Analytics Payload Format:

```
{"overall_manager": 123,
 "overall_nonmanager": 30,
 "overall_external": 25,
 "work_manager": 123,
 "work_nonmanager": 30,
 "work_external": 25,
 "afterwork_manager": 123,
 "afterwork_nonmanager": 30,
 "afterwork_external": 25}
```
API Payload Format:

```
{
    'data': [
        {
            'model_name': 'benchmarkgroup',
            'record_id': 60,
            'label': 'Business',
            'values': {
                'work': {
                    'external': 5.96,
                    'manager': 16.6,
                    'non_manager': 9.79
                },
                'after_work': {
                    'external': 19.61,
                    'manager': 17.74,
                    'non_manager': 7.14
                },
                'all_day': {
                    'external': 16.27,
                    'manager': 4.54,
                    'non_manager': 6.8
                }
            }
        },
        {
            'model_name': 'benchmarkgroup',
            'record_id': 61,
            'label': 'Analytics',
            ...
        }
    ],
    'metadata': {
        'key': 'dover_drivers',
        'start_date': '2017-02-01',
        'end_date': '2017-02-28'
    }
}
```

According to some embodiments, the workspace planning module of the Participant Analytics Platform 250 may determine communication traffic per location and return an adjacency matrix for all location pairs. For example, the following metrics may be determined:

dcoll_location_based_distribution_email: volume of communication over email from one location to another;

dcoll_location_based_distribution_meeting: volume of communication over meeting between one location and another;

dcoll_location_based_distribution_chat: volume of communication over chat between one location and another;

dcoll_location_based_distribution_call_no_meeting: volume of communication over calls (not included in meetings) between one location and another; and dcoll_location_based_distribution all: volume of communication across all communication media between one location and another According to some embodiments, in additional to the data that is utilized for the other metrics, the location of each participant is needed. This may be obtained from the building location of each participant as listed in the participant list or from the senor data collected by the electronic badge a participant wears.

In some embodiments, the Participant Analytics Platform 250 may group participants by their respective building and sum all their communication data to other buildings. For example, the Participant Analytics Platform 250 is able to visualize the volume of communication per regional office to other regional offices of an organization.

Figure 13:
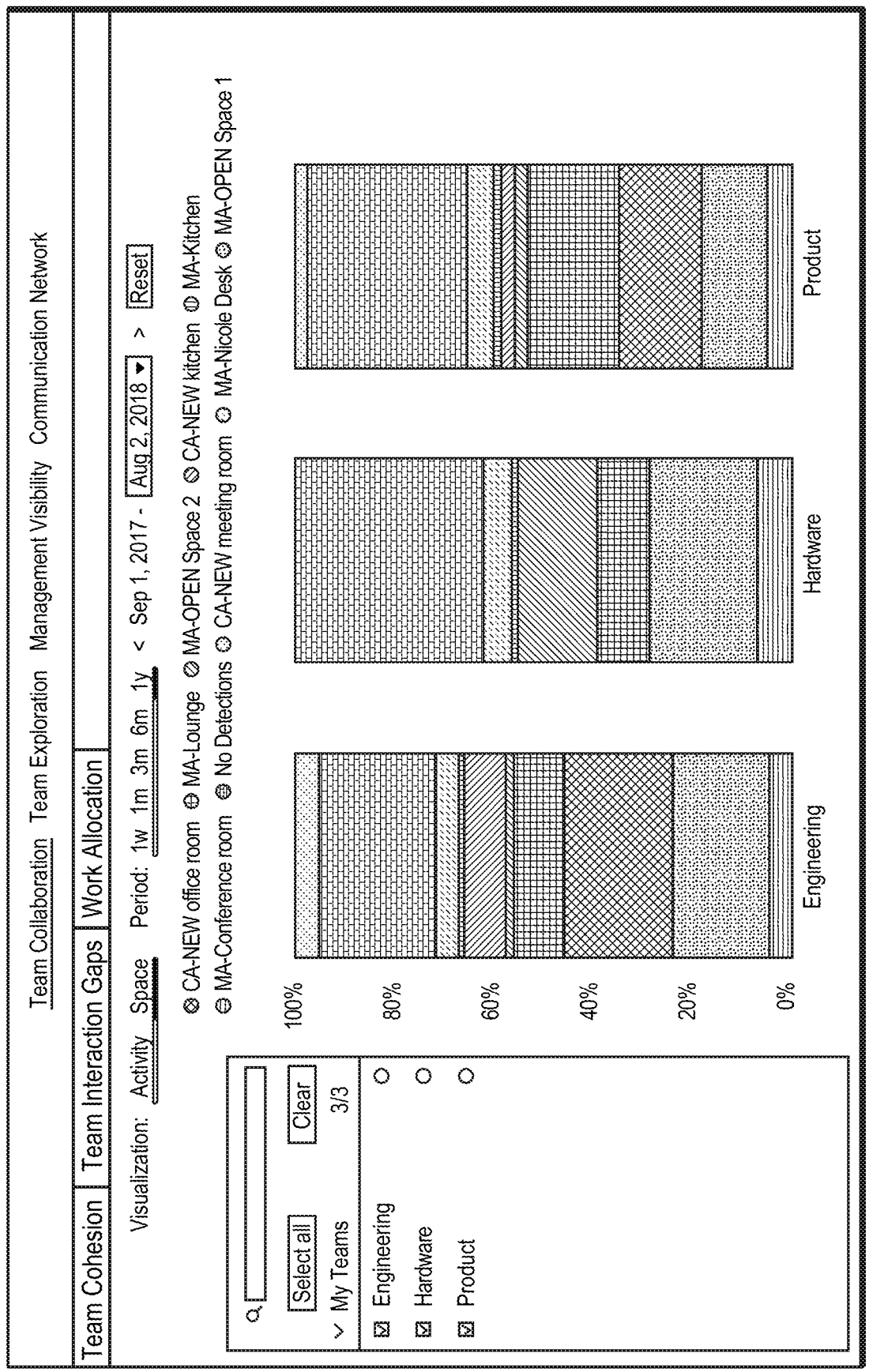
FIG. 13 depicts an example visualization illustrating the percentage of work that is performed at various locations throughout an organization, according to embodiments of the present disclosure.

According to some embodiments, the Participant Analytics Platform 250 converts the analytics payload into an API payload and then to a dashboard visualization such as FIG. 13. Below is an example analytics payload and an API payload.

Analytics Payload Format:

```
dcoll_location_based_distribution_email
{u'edges': [[u'Building101', u'Building102', 31],
            [u'Building101', u'Building103', 24],
            [u'Building101', u'Building104', 27],
            [u'Building102', u'Building103', 19],
            [u'Building102', u'Building104', 31]],
 u'nodes': [u'Building101',
            u'Building102',
            u'Building103',
            u'Building104']}
```
API Payload Format:

```
{
    "data": {
        "nodes": [
            {
                "location_id": 1060
            },
            {
                "location_id": 1061
            },
            {
                "location_id": 1063
            }
        ],
        "edges": [
            {{"to":1060,"from":1061,"weight":35},
             {"to":1060,"from":1063,"weight":210),
             {"to":1061,"from":1063,"weight":182),
             {"to":1061,"from":1060,"weight":21},
             {"to":1063,"from":1061,"weight":20},
             {"to":1063,"from":1060,"weight":0}}
        ]
    }
}
```

FIG. 13 depicts an example visualization illustrating the percentage of work that is performed at various locations throughout an organization for three different teams of participants, according to embodiments of the present disclosure.

According to some embodiments, the workload assessment module of the Participant Analytics Platform 250 may determine average time it takes each participant to respond to emails during work hours and non-work hours. This metric looks at both an original email and the reply to that email to calculate the response time. However, in some embodiments, the following email replies are not considered: self-replies (i.e., replies that are sent to only the participant from the same participant), auto-replies (i.e., emails replies that are too quick to be natural—the current default is set to 10 seconds), and all replies that are more than 30 days old.

According to some embodiments, the Participant Analytics Platform 250 may determine response times to different categories of emails. The following are example categories of emails that the Participant Analytics Platform 250 may determine for each participant:

work: average response time of all replies that were sent out during the normal work hours as defined in the participant list;

afterwork: average response time of all replies that were sent out outside the normal work hours;

overall: average response time of all replies that were sent out during the 24-hour period;

work_manager: average response time of all replies that were sent out during the normal work hours, where one of the recipients was a manager;

afterwork_manager: average response time of all replies that were sent out outside the normal work hours, where one of the recipients was a manager;

overall_manager: average response time of all replies that were sent out during the 24-hour period, where one of the recipients was a manager;

work_nonmanager: average response time of all replies that were sent out during the normal work hours, where none of the recipients was a manager;

afterwork_nonmanager: average response time of all replies that were sent out outside the normal work hours, where none of the recipients was a manager; and overall_nonmanager: average response time of all replies that were sent out during the 24-hour period, where none of the recipient was a manager.

According to some embodiments, the following data may be utilized: participant list: manager/non-manager, expected work hour start and end (default is 9 am to 6 pm), and time zone; and email: From, To/CC/BCC, Sent, MessageID, and InReplyTo.

Figure 14:
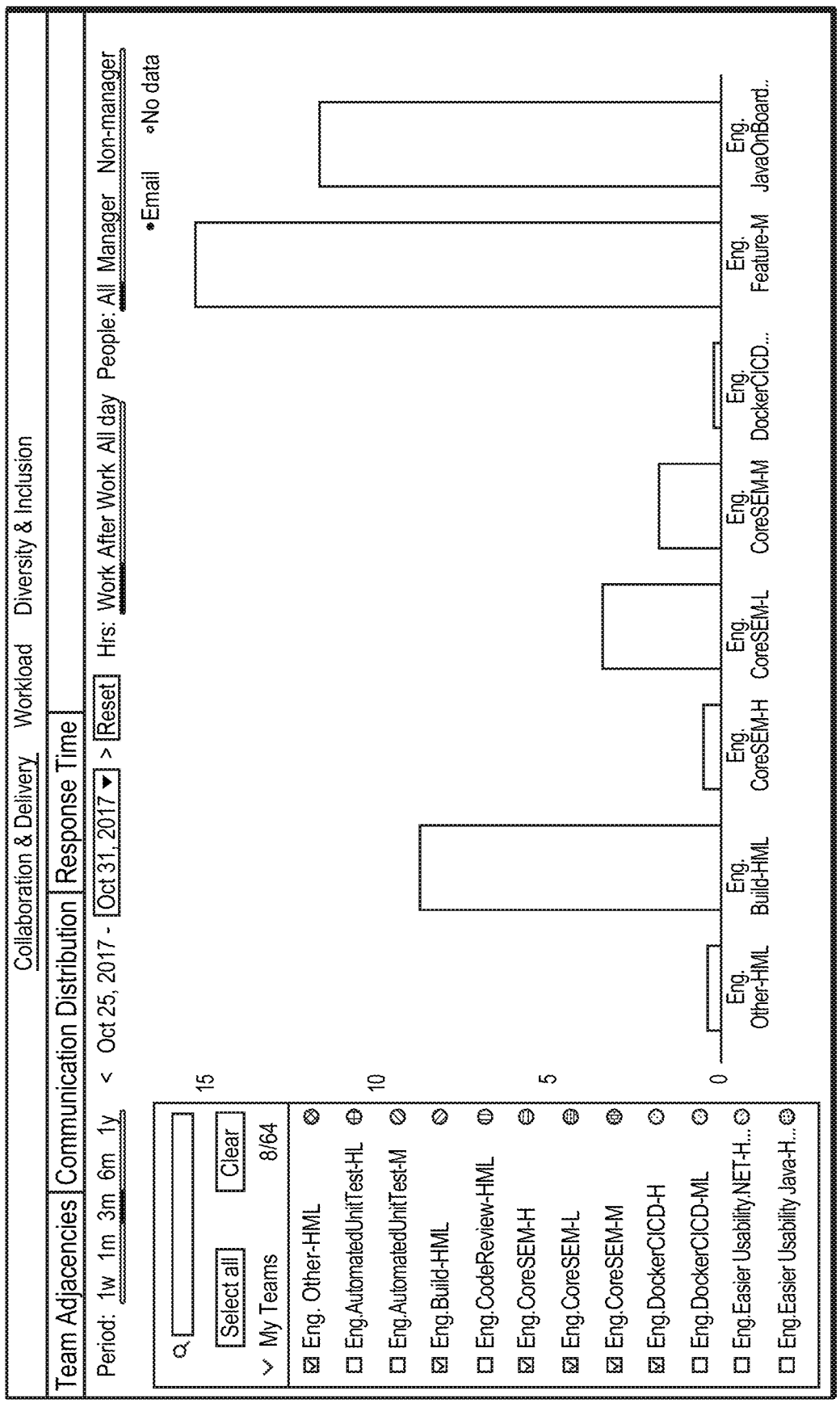
FIG. 14 depicts an example visualization illustrating the average time it takes participants to respond to emails during work hours and non-work hours, according to embodiments of the present disclosure.

According to some embodiments, the Participant Analytics Platform 250 converts the analytics payload into an API payload and then to a dashboard visualization such as FIG. 14. Below is an example analytics payload and an API payload.

---
Analytics Payload Format:

For a weekday (M-F)
{"work":3.5,
"afterwork": 30.0,
"overall" : 18.3,
"work_manager":None,
"afterwork_manager": 30.0,
"overall_manager": 18.3,
"work_nonmanager":3.5,
"afterwork_nonmanager": 30.0,
"overall_nonmanager": 18.3}

For a weekend (Sat, Sun)
{"afterwork": 30.0,
"overall": 18.3,
"afterwork_manager": 30.0,
"overall_manager": 18.3,
"afterwork_nonmanager": 30.0,
"overall_nonmanager": 18.3}

API Payload Format:

{
  'data': [
    {
      'model_name': 'benchmarkgroup
      'record_id': 60,
      'label': 'Business',
      'values': {
        'work': {
          'all': 5.96,
          'manager': 16.6,
          'nonmanager': 9.79
        }, ---continued 'afterwork': {
          'all': 19.61,
          'manager': 17.74,
          'nonmanager': 7.14
        },
        'overall' : {
          'all': 16.27,
          'manager': 4.54,
          'nonmanager': 6.8
        }
      }
    },
    {
      'model_name': 'benchmarkgroup',
      'record_id': 61,
      'label': 'Analytics',
      ...
    }
  ],
  'metadata': {
    'key': 'dover_response_time_email',
    'start_date': '2017-02-01',
    'end_date': '2017-02-28'
  }
}

---

FIG. 14 depicts an example visualization illustrating the average time it takes each participant to respond to emails during work hours and non-work hours, according to embodiments of the present disclosure.

According to some embodiments, the workload assessment module of the Participant Analytics Platform 250 may determine the average work day length per participant, per group of participants, and/or for the entire organization. In some embodiments, the Participant Analytics Platform 250 may determine the average number of minutes that a participant is estimated to be working by calculating the following metrics. Work (time): total work day length based on normal work hours as defined by the expected work times in the participant list. After-work (time): total time spent on communication outside of the expected work hours (this could be before or after normal work hours). Overall (time): total time spent working (work time+after-work time).

According to some embodiments, the Participant Analytics Platform 250 converts the analytics payload into an API payload and then to a dashboard visualization. Such as FIG. 15 Below is an example analytics payload and an API payload.

---
Analytics Payload Format:

For one person per day the following format of payload will be passed:
{"work":540, "afterwork":30, "overall":570}
API Payload Format:

/metrics_team_aggregate
{
  "data": [
    {
      "model_name": "benchmarkgroup",
      "record_id": 60,
      "label": "Business",
      "values": {
        "afterwork": 74.13,
        "work": 540,
        "overall": 614.13
      },
    },
    {
      "model_name": "benchmarkgroup",
      "record_id": 61,
      "label": "Analytics", -continued

```
        ...
    }
],
```

```
    "metadata": {
        "key": "dover_workday_len",
        "start_date": "2017-02-01",
        "end_date": "2017-02-28"
    }
}
/metrics_participant_aggregate
{
    "data": [
        570,
        430,
        20,
        680,
        525,
        618
    ],
    "metadata": {
        "key": "dover_workday_len",
        "start_date": "2017-02-01",
        "end_date": "2017-02-28"
    }
}
```

Figure 15:
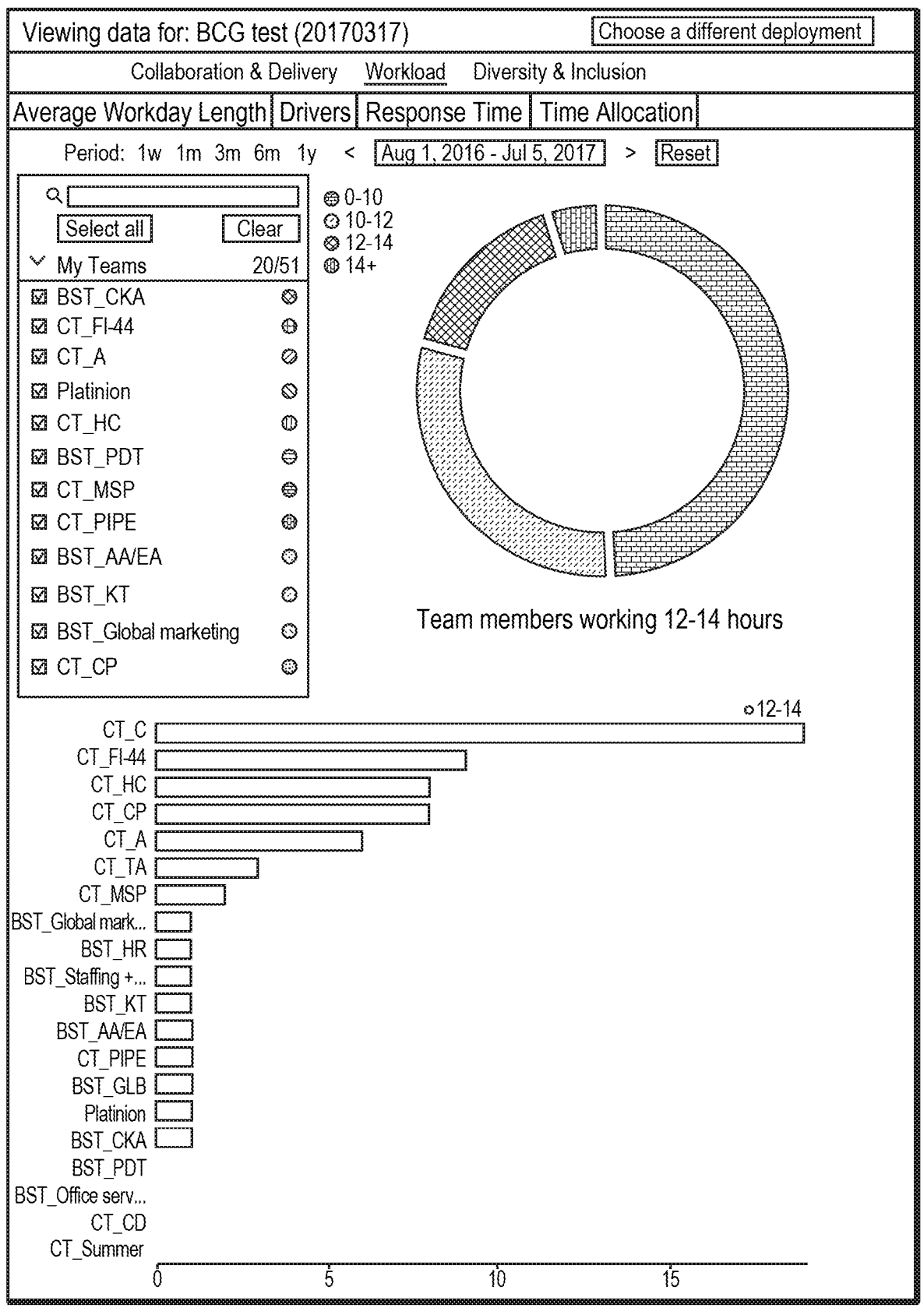
FIG. 15 depicts an example visualization illustrating the average work day length for teams of participants, according to embodiments of the present disclosure.

FIG. 15 depicts an example visualization illustrating the average work day length for teams of participants, according to embodiments of the present disclosure.

Below are example technical details that may be used to implement embodiments of the present disclosure. According to some example embodiments, the DGGT 225 may include an application written in the programming language C#, and executed by a processor. The application may be run through an operating system (e.g., WINDOWS, MAC OS, and LINUX OS) on either a server or workstation as long as the workstation has access to the appropriate servers (e.g., a workstation with access to the organization's network 215). The application may, for example, leverage several MICROSOFT public APIs using a set of user specified configurations in order to extract the communication data needed, and allocate the communication data to the correct files for email, calendar, conference, call, and chat. In some embodiments, the application may similarly use GOOGLE APIs to collect G Suite email and calendar data.

The table below includes example MICROSOFT APIs that may be used by the DGGT 225:

| | |
|---|---|
| ExchangeService.EnableScpLookup | Gets or sets a value that indicates whether Exchange Web Services (EWS) should perform a service connection point (SCP) lookup when it is determining the service URL |
| ExchangeService.Credentials | Uses either Windows Authentication or Basic authentication to authenticate the calls made to the Report Server Web service. |
| ExchangeService.UseDefaultCredentials | If preferred, not providing credentials in the configuration file will Authenticate to Exchange with the user running the DGGT. |
| ExchangeService.WebServiceURL | Uses the Web Service URL page to configure or modify the URL used to access the report server. |
| ExchangeService.ImpersonatedUserId | Gets or sets the ID of the user who Exchange Web Services (EWS) is to impersonate. |
| ExchangeService.FindFolders | Obtains a list of folders by searching the subfolders of a specified folder. |
| ExchangeService.FindItems | Finds items in a specified mailbox. |
| ExchangeService.Appointments | Returns a list of appointments from a calendar folder. |
| ExchangeService.LoadPropertiesForItems | Loads the properties of multiple items in a single call to Exchange Web Services (EWS). |

Below is example extracted MICROSOFT EXCHANGE metadata that may be extracted for different types of communications.

Email:
ItemSchema.DateTimeSent, ItemSchema.DateTimeReceived, Item Schema. Importance,
ItemSchema.Sensitivity, ItemSchema.InReplyTo, Item Schema. ConversationId,
ItemSchema.Size, ItemSchema.HasAttachments,
EmailMessageSchema.Sender,
EmailMessageSchema.BccRecipients, EmailMessageSchema.ToRecipients,
EmailMessageSchema.CcRecipients, EmailMessageSchema.InternetMessageId,
ItemSchema.Culture, ItemSchema.IsDraft
Appointment/Meeting:
AppointmentSchema.RequiredAttendees, AppointmentSchema.OptionalAttendees,
AppointmentSchema.Location, AppointmentSchema. Start,
AppointmentSchema.End,
AppointmentSchema.IsMeeting, AppointmentSchema.IsOnlineMeeting,
AppointmentSchema.IsAllDayEvent, AppointmentSchema.MyResponseType,
AppointmentSchema.Organizer, Item Schema.DateTimeSent, ItemSchema.DateTimeReceived,
ItemSchema.InReplyTo, AppointmentSchema.ICalUid, ItemSchema.ConversationId,
ItemSchema.Importance, ItemSchema.Sensitivity, Item Schema.HasAttachments,
ItemSchema.Size, AppointmentSchema.IsRecurring, AppointmentSchema.Recurrence,
ItemSchema.Culture
Sessions, Chat & VoIP:
ItemSchema.ConversationId, Item Schema.DateTimeSent, EmailMessageSchema.Sender, EmailMessageSchema.ToRecipients, ItemSchema.Body.

In some embodiments, the body (i.e., ItemSchema.Body) of the messages is pulled for the purpose of extracting the number of messages and sender within a single conversation thread. The statistics are extrapolated in the application and the body of the email may not be written to the file. In some embodiments, the application is configurable to avoid capturing the body of the messages or any other actual content of the communication itself.

Below is example extracted SKYPE Data for Business SQL Data metadata that may be extracted for different types of communications.
Schema: Call detail recording (CDR)
Table: MediaView
Skype:
SessionIdTime, SessionIdSeq, InviteTime, FromUri, ToUri, EndTime,
FromMessageCount, ToMessageCount, ToClientVersion, CorrelationId, ResponseTime,
IsFromInternal, IsToInternal, Media, MediaStartTime, MediaEndTime.

The table below includes example GOOGLE APIs that may be used by the DGGT:

| | |
|---|---|
| Auth.OAuth2.ServiceAccountCredential.Scopes property | Specifies the services and service methods the service account is allowed to use; it is email and calendar read only for the DGGT. |
| Auth.OAuth2.ServiceAccountCredential.ServiceAccountCredential | Constructs a new service account credential using the given scopes of access, user email, and service account key. Getting data for each user requires a service account key specific to that user. |
| GmailService.Users.Messages.List | Gets a list of all email message IDs for a given user email in a user-specified date range. |
| GmailService.Users.Messages.Get | Gets an individual email message given the user email and the message ID. |
| Google.Apis.Requests.BatchRequest | Makes multiple calls at a time to reduce call overhead; batches messages. Get calls to speed up email data collection. |
| CalendarService.CalendarList.List | Gets the list of calendars for a given user email. |
| CalendarService.Events.List | Gets a list of individual events for a given user email and calendar ID. |
| DirectoryService.Users.Get | Gets the profile information for a given user. |

Below is example extracted GOOGLE/G-SUITE metadata that may be extracted for different types of communications.
Email:
From, To, Cc, Bcc, Message-Id, InReplyTo, ConversationId, IsDraft, Sent, Received, HasAttachments, Size, Importance, Offset.
Calendar:
To, ICalUid, Sent, Start, End, Location, IsMeeting, IsAllDay, IsRecurring, MyResponse To, ICalUid, Sent, Start, End, Location, IsMeeting, IsAllDay, IsRecurring, MyResponse.

According to some embodiments, the DGGT application may be setup and configured on a computer workstation or server. For example, the DGGT application may be downloaded to the computer workstation or server connected to the organization's network. The DGGT application's configuration file (e.g., config.txt) may be setup and be located in the same directory as the DGGT application (e.g., DGGT.exe).

According to some embodiments, the configuration file may be encrypted. Before executing the DGGT application, a user may encrypt the configuration file. For example, the configuration file may be encrypted using MONO, a software platform designed to allow developers to easily create cross platform applications part of the .NET Foundation. An example command to encrypt a configuration file is "mono Dggt.exe-e keyName sample.google.config.txt", with -e specifying the option to encrypt and keyName being a user defined key that will be created in the keyStore of the local environment.

In some embodiments, the participant list (e.g., users.txt), which includes a list of unique user identifiers, is setup in the same directory as the configuration file. For example, users.txt may include the following user identifiers: user-01@humanyze.info, user-02@humanyze.info, user-03@humanyze.info, user-04@humanyze.info, user-05@humanyze.info, user-06@humanyze.info, user-07@humanyze.info, user-08@humanyze.info, user-09@humanyze.info.

In some embodiments, the DGGT application (i.e., DGGT.exe) may be executed with commands according to the digital stream (i.e., communication data) to be captured by the DGGT application. For example, the captured digital stream may be from MICROSOFT EXCHANGE, SKYPE, and/or GOOGLE/G-SUITE. The command to execute the DGGT application may include four arguments specifying the digital stream, the path to the configuration file (i.e., config.txt), the path to the participant list (i.e., users.txt), and the keyName (i.e., the user defined key created during encryption). Example execution commands include: "mono DGGT.exe exchange sample.exchange.config.enc.txt users.txt keyName"; "mono DGGT.exe skype sample.skype.config.enc.txt users.txt keyName"; and "mono DGGT.exe google sample.google.config.enc.txt users.txt keyName". According to some embodiments, after the DGGT application is executed, the DGGT application will output a Comma Separated Values (CSV) file (e.g., input.csv).

FIG. 16 illustrates an example EXCHANGE configuration file. According to some embodiments, an EXCHANGE configuration file (i.e., config.txt) may contain the following fields:
from_date—the date that DGGT will pull data from (Example: 3 Mar. 2016);
exchange_version—version of Exchange to pull from (Example: Exchange 2013);
server_url—URL to the Exchange server;
admin_username—exchange Admin or Imitation user;
admin_password—exchange Admin or Imitation password;
admin_domain—exchange instance domain name;
admin_type—type of user (impersonation or delegation);

hash_salt—salt string provided when hashing sensitive fields in the data reports produced by the DGGT; for example, sensitive fields may include folder names, email addresses, locations, etc.;
hash_iterations—hashing algorithm property that controls how often each hashed value is processed through the algorithm itself;
to_date—the date that the DGGT will pull data to (Example: 2 Jan. 2017);
hash_exclusions_owner—boolean string to exclude the owner from being hashed;
hash_exclusions_domain—boolean string to exclude the domains of email usernames from being hashed;
hash_exclusions_location—boolean string to exclude the location from being hashed; and
client_directory—directory that the reports are to be saved to (e.g.: C:\DGGT_Reports\).

FIG. 17 illustrates an example SKYPE configuration file. According to some embodiments, a SKYPE configuration file (i.e., config.txt) may contain the following fields:
from_date—date the DGGT will pull data from (Example: 3 Mar. 2016)
data_source—name of the data source that the LcSCDR database is in (Example: SKYPE \MONITORING);
initial_catalog—name of the database to be accessed (Example: LcSCDR);
integrated_security—a boolean, should be false when specifying the User ID and Password, true otherwise;
hash_salt—salt string provided when hashing sensitive fields in the data reports produced by the DGGT; for example, sensitive fields may include folder names, email addresses, locations, etc.;
hash_iterations—hashing algorithm property that controls how often each hashed value is processed through the algorithm itself;
to_date—date that the DGGT will pull data to (Example: 2 Jan. 2017);
user_id—username of the user with access to LcSCDR database (Example: skypedomain\skypeUser);
password—user password;
hash_exclusions_owner—boolean string to exclude the owner from being hashed;
hash_exclusions_domain—boolean string to exclude the domains of email usernames from being hashed; and
client_directory—directory the reports are to be saved to (e.g., C:\DGGT_Reports\).

FIG. 18 illustrates an example GOOGLE configuration file. According to some embodiments, a GOOGLE configuration file (i.e., config.txt) may contain the following fields:
from_date—date that the DGGT will pull data from (Example: 3 Mar. 2016);
to_date—date that the DGGT will pull data to (Example: 2 Jan. 2017);
key_path—path and name where the DGGT can find the service account private key, relative to the working directory (e.g., path from working directory/service_account_private_key.json);
admin_email—email address of the G-SUITE administrator who gave the service account domain-wide access;
hash_salt—salt string provided when hashing sensitive fields in the data reports produced by the DGGT; for example, sensitive fields may include folder names, email addresses, locations, etc.;
hash_iterations—hashing algorithm property that controls how often each hashed value is processed through the algorithm itself;
hash_exclusions_owner—boolean string to exclude the owner from being hashed;
hash_exclusions_domain—boolean string to exclude the domains of email usernames from being hashed;
hash_exclusions_location—boolean string to exclude the location from being hashed; and
client_directory—directory that the reports are to be saved to (e.g., C:\DGGT_Reports\).

According to some embodiments, the data may be hashed in order to encrypt and obfuscate the data to protect the anonymity and privacy of the participants. Through configuration, the DGGT application allows users the option to provide the salt used by the hashing algorithm to anonymize the data prior to sending the extraction files to the Participant Analytics Platform 250. In order for Participant Analytics Platform 250 to provide accurate analytics, it requires a connection between the participants and the extracted metadata and sensor data. In other words, the connections between the participants and their respective extracted metadata and sensor data must be maintained after hashing.

In some embodiments, the DGGT application includes a hashing algorithm (e.g., ADHashing.exe) which leverages the configuration file and participant list file to hash the participant list with the same hashing configuration that will be used for the on-going data extraction. The hashing algorithm is compatible with any CSV file (i.e., input.csv) as long as the email column is in the very first (far left column). In some embodiments the hashing algorithm may filter the CSV file for only the participants in the participant list in order to create a final participant-to-hash file. It is critical that the hash and salt configuration stays consistent for all extracts.

In some embodiments, the CSV file may be hashed, for example, using MONO and the following example commands: "mono ADHashing.exe exchange hash config.txt input.csv keyName"; or "mono ADHashing.exe exchange both config.txt input.csv keyName". After the hashing algorithm finishes, a CSV file is outputted (e.g., outputdatetime.csv).

According to some embodiments, the DGGT application may have several application settings. These application settings may be adjusted based on user preferences or specific use of the application to improve performance.

Failure Thresholds are settings that determine when the application has had an unacceptable number of errors and should end prematurely. The failure threshold maxFailureThreshold determines the point at which too many users have failed and the application should stop collecting data. The maxFailureThreshold may have default value of 0.25, thus, the application would reach the maxFailureThreshold once 25% of users have failed.

The failure threshold maxFailureThresholdPerUser is an EXCHANGE and GOOGLE specific threshold that determines the point at which too many individual email/calendar items have failed for a user, and the user should fail (i.e., none of the user's data is kept). The setting maxFailureThresholdPerUser may have default value of 0.01.

Some embodiments of the DGGT application includes performance settings. The performance setting maxNumberOfThreads determines the number of users running at the same time. This setting may be based on the number of processors the computer has and generally should not exceed 16 (adding threads doesn't always make it faster and increases the risk of throttling). The setting maxNumberOfThreads may have default value of 8.

The performance setting useNagleAlgorithm reduces the number of packets sent over the network by waiting to send packets until they're full (which may add a delay). The setting useNagleAlgorithm may have default value of false. The performance setting expect100Continue when active sends the headers of a request to the server, waits for a positive response, and then sends the body of the request (which adds a delay but saves time if requests fail). The setting expect100Continue may have default value of true.

The performance setting delegationPausePeriod is an EXCHANGE specific setting only for delegation-type administrators. In some embodiments, the DGGT application is configured to pause every 15 users to reduce the chance of throttling. The setting delegationPausePeriod defines how long (in seconds) the DGGT application will pause in between groups of 15 users. The setting delegationPausePeriod may have default value of 60.

Other settings include maxReadLineLength and maxBatchesAllowedInList. These settings do not significantly impact performance, and protect the application from external attacks or memory errors. The setting maxReadLineLength protects against denial of service (DOS) attack by limiting the input string length. The setting maxReadLineLength may have default value of 300. The setting maxBatchesAllowedInList is GOOGLE specific, and prevents segmentation faults by limiting the number of hundred-email batches held in memory (i.e., not yet written to the CSV) for each user. The setting maxBatchesAllowedInList may have default value of 500.

Various metrics can be determined based on the collected data, and that can be used for many useful purposes. For example, a quantified metric can be determined that estimates how well a seating assignment of the participants matches a communication volume among the participants, which can involve the determination of an alignment index and an inefficiency (wasted time) index.

The alignment index shows how much of a participant's communication happens with people that are in assigned seats far from the participant's assigned seat. This index gets lower as the participant has more communication with people who are seated far from the participant. For a participant with a lot of communication (e.g., CEO), it is preferable if everyone that the participant talks to happen to be assigned to the neighborhood as the participant. Such a scenario cannot always happen realistically, but having more core collaborators closer to the participant make the alignment index higher. For participants with little communication (e.g., individual contractor), if the participant only talks to one person once a week, it really does not matter much where that participant is located, that is, not much efficiency is lost.

An example alignment index can be determined by:

(1) Creating a pairwise of seating assignment distance per participant (can be low resolution, e.g., floor level). Participants in the same neighborhood/floor having the lowest score (0.0), participants in different countries having the highest score (1.0).

(2) Preparing a pairwise attention minute matrix of the same participant group, normalized to be between 0-1.1 is the maximum amount of communication a pair can have.

(3) Perform a multiplication (cell-by-cell) of the two list the sum the value. Subtract this number from 1, which becomes the alignment index per participant.

A meeting inefficiency (wasted time) index can be determined by:

(1) For each participant, examine the volume of meeting minutes with each other participant they communicate with.

(2) For each other person, determine how likely the meeting happened in person (between the two participants) or remotely through a call.

(3a) For meeting minutes that are estimated to have happened in person, estimate the travel time per meeting based on the distance between the assigned seats (roughly, e.g., at the floor level).

(3b) For meeting minutes that are estimated to have happened remotely over a call, estimate the loss of efficiency (in minutes) due to technical setup and lack of media richness (verified by and widely accepted by multiple research literature).

(4) Add the two numbers from above (3a+3b) to result in as estimated time lost from ideal.

Other useful indices include a clusteredness index per team, a siloness index per team, and a critical adjacency index between two teams.

A clusteredness index shows how clustered a team is. Higher scores indicate a unified cluster, whereas lower scores indicate multiple cliques or low-density teams. An example clusteredness index can be determined by:

(1) Running a community detection algorithm (e.g., known community structure detection algorithms for complex networks).

(2) For each team, determining the count of members in each detected community.

(3) Finding the community that has the largest count of members to result in a [max member count in a single community].

(4) Dividing the [max member count in a single community] by the total count of team members.

A siloness index shows how siloed a team is from all other teams in the network. An example siloness index can be determined by:

(1) Running a community detection algorithm (e.g., known community structure detection algorithms for complex networks).

(2) For each team, determining the count of members in each detected community.

(3) For each team, determining the dominance of that team in each community where 1 or more team members exist. Dominance of a team in a community can be calculated as [team member count in that community] divided by [total count of people in that community].

(4) Determining the weighted dominance per team in each community, which can be [team member count in that community over total member count] multiplied by [dominance of the team in that community].

(5) Summing the weighted dominance across all communities to result in the siloness index.

A critical adjacency index between shows how dependent two teams are on each other given the volume of communication. An example critical adjacency index can be determined by:

(1) Running a community detection algorithm (e.g., known community structure detection algorithms for complex networks).

(2) For each team, determining the count of members in each detected community.

(3) For each team-pair, e.g. (TeamA, TeamB), considering each community where both teams' members are present (1 or more from each team).

(4) For each community, calculating the ratio of [team members detected to be in that community] divided by [total team member count] for both teams and multiply the two values. That is, {[teamA members detected to be in that community] divided by [total teamA member count]}×{

[teamB members detected to be in that community] divided by [total teamB member count]}

(5) Summing the values over all communities to result in the critical adjacency index.

Figure 19:
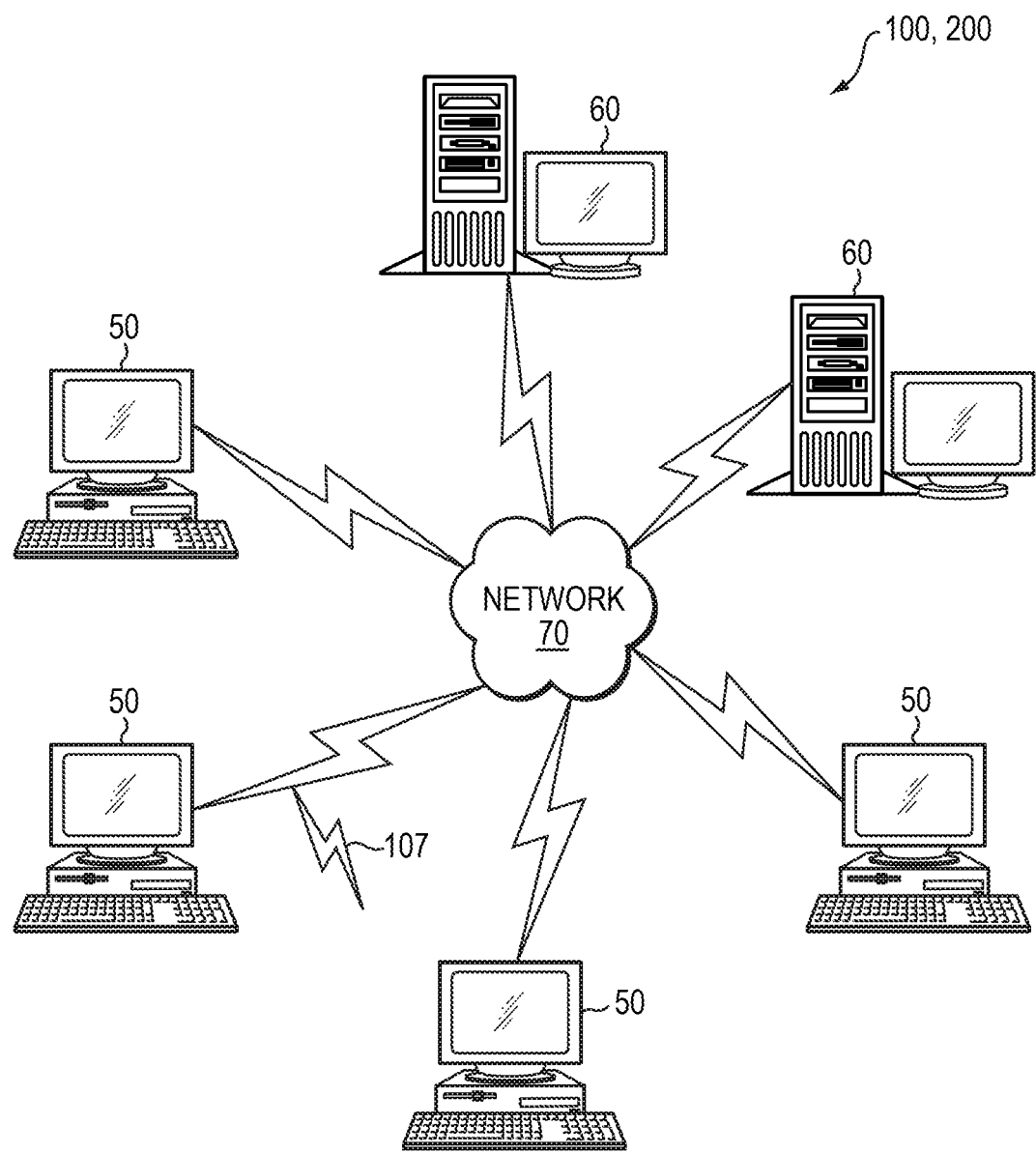
FIG. 19 illustrates a computer network or similar digital processing environment in which the present invention may be implemented.

FIG. 19 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Client devices/computers 50 implement badges (sensors) 205 and computers 225 described above, and servers 60 implement base stations 210, central computers 215 and servers 220 described above. Other electronic device/computer network architectures are suitable.

Figure 20:
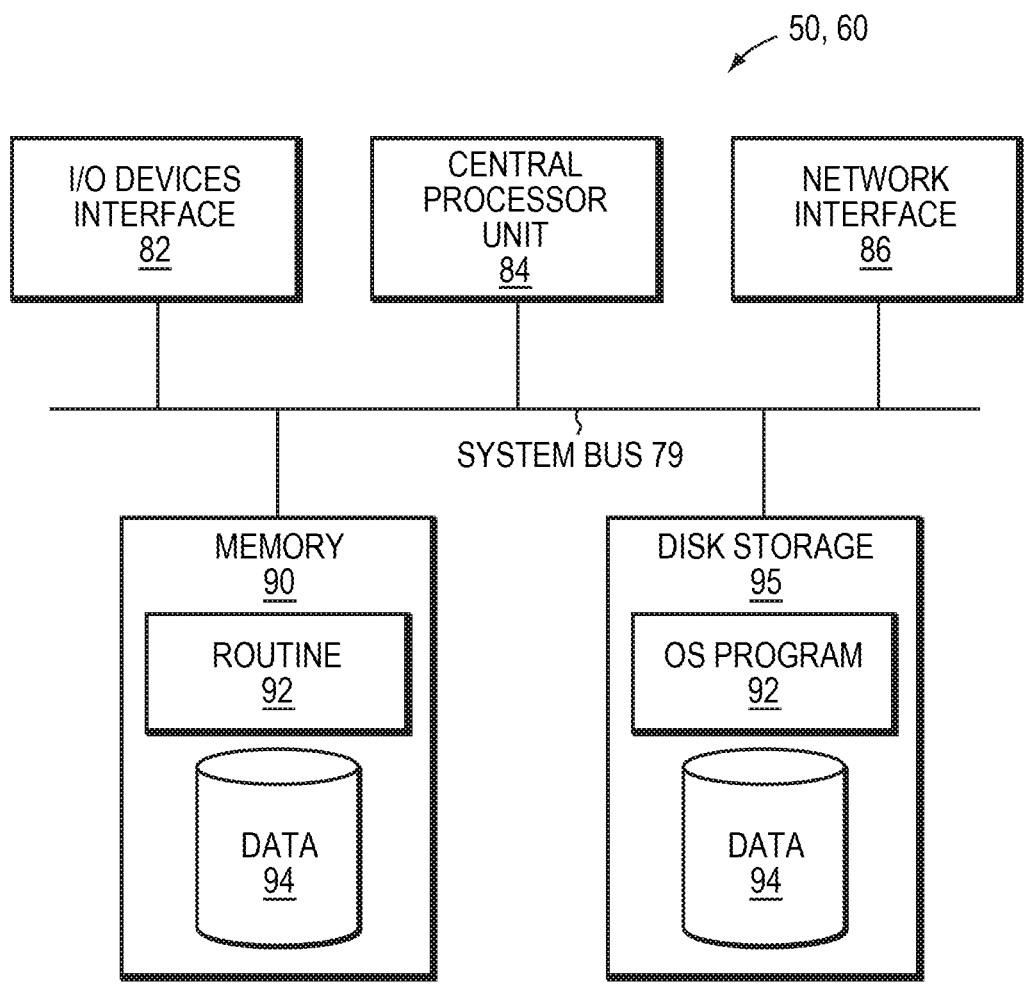
FIG. 20 is a diagram of the internal structure of a computer in the computer system of FIG. 19.

FIG. 20 is a diagram of the internal structure of a computer (e.g., client processor/device 50 or server computers 60) in the computer system of FIG. 19. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 19, organization's network 215 of FIG. 2). Memory 90 provides volatile storage for computer software instructions 92 and data 94 used to implement an embodiment of the present invention (e.g., sensor data analysis, visualization of calculated metrics, user interface of same and supporting code 100, 200, 250, 300, 500, 700, 800, etc. detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer implemented method for objectively measuring digital communication in an organization, the method comprising:

generating a participant list identifying a plurality of participants within an organization;

capturing digital communication data for each of the plurality of participants;

extracting metadata from the captured communication data, the extracted metadata being attributes of one or more communications from the captured communication data, wherein the attributes extracted are based on type of the one or more communications;

associating the extracted metadata with respective participants of the plurality of participants identified on the participant list;

analyzing the extracted metadata by:

calculating time spent on each communication for each of the plurality of participants during a period of time, prioritizing the communications from each participant to each other participant during the period of time to eliminate concurrent communications from the calculated time spent on each communication for each of the plurality of participants, wherein the concurrent communications are eliminated based on communication type of each concurrent communication, for each participant, determining attention time spent communicating with each other participant based on the prioritized communications from the participant to each other participant, thereby determining an objective measure of digital communication in the organization, and building a pairwise adjacency matrix based on the attention time each participant spent communicating with each other participant; and generating and displaying a visualization of the pairwise adjacency matrix illustrating the objective measure of digital communication and communication distribution of the participants throughout the organization.

2. The computer implemented method of claim 1 wherein the one or more communications are communications between participants and other correspondents; and wherein determining attention time for each participant includes determining attention time spent communicating with each other participant and each other correspondent based on the prioritized communications from the participant to each other participant and each other correspondent; and wherein building a pairwise adjacency matrix includes building a pairwise adjacency matrix based on the attention time each participant spent communicating with each other participant and each other correspondent.

3. The computer implemented method of claim 1 further comprising:
collecting sensor data from a plurality of electronic devices that detect participant actions within a physical space; and
associating the collected sensor data with respective participants of the plurality of participants identified in the participant list, the collected sensor data informing of attributes of one or more communications;
wherein analyzing the extracted metadata includes analyzing the collected sensor data.

4. The computer implemented method of claim 3 wherein the electronic devices are wearable electronic devices worn by participants.

5. The computer implemented method of claim 3 wherein building the pairwise adjacency matrix includes building the pairwise adjacency matrix based on location information derived from the sensor data.

6. The computer implemented method of claim 1 further comprising anonymizing the participant list and the extracted metadata while maintaining the association between participants and respective extracted metadata.

7. The computer implemented method of claim 6 wherein the anonymizing is performed by applying a hashing algorithm to participant identifiers in the participant list and the participant identifiers in the extracted metadata.

8. The computer implemented method of claim 1 wherein the captured communication data includes one or more of: email data; calendar data; call data; and chat data.

9. The computer implemented method of claim 1 wherein calculating time spent on each communication for each of the plurality of participants during a period of time includes calculating time spent on each sent email of a plurality of emails for each of the plurality of participants during a period of time by assigning a default amount of time spent to each sent email or an amount of time between consecutive emails sent by a respective participant, whichever amount of time is less.

10. The computer implemented method of claim 9 wherein determining, for each participant, attention time spent communicating with each other participant based on the prioritized communications from the participant to each other participant includes determining, for each participant, attention time spent emailing with other participants by dividing the time spent on each sent email by a number of other participants whom received the respective email and allocating the divided time to each of the other participants whom received the respective email as attention time spent by the respective participant.

11. The computer implemented method of claim 1 wherein calculating time spent on each communication for each of the plurality of participants during a period of time includes calculating time spent on each meeting of a plurality of meetings for each of the plurality of participants during a period of time.

12. The computer implemented method of claim 11 wherein determining, for each participant, attention time spent communicating with each other participant based on the prioritized communications from the participant to each other participant includes determining, for each participant, attention time spent attending meetings with other participants by dividing the time spent on each meeting by a number of other participants whom attended the respective meeting and allocating the divided time to each of the other participants whom attended the respective meeting as attention time spent by the respective participant.

13. The computer implemented method of claim 1 wherein the communications are prioritized by an order of priority of (1) meetings, (2) calls, (3) emails, and (4) other communication types.

14. The computer implemented method of claim 1 wherein the pairwise adjacency matrix is directional.

15. The computer implemented method of claim 1 wherein the pairwise adjacency matrix is weighted.

16. The computer implemented method of claim 1 further comprising:
determining an alignment score for a given participant indicating how proximity with each other participant that the given participant interacts with correlates with a communication volume with each other participant; and
determine a time waste score based on the given participant's travel time to meetings and technology use.

17. The computer implemented method of claim 1 further comprising:
organizing the plurality of participants into groups of participants;
for each group, aggregating the attention time of each participant in the respective group of participants together to determine aggregated attention time each group spent communicating with each other group;
building a group pairwise adjacency matrix based on the aggregated attention time each group spent communicating with each other group; and
generating and displaying a visualization of the group pairwise adjacency matrix illustrating communication distribution of the groups throughout the organization.

18. The computer implemented method of claim 1 further comprising combining sensor data with calendar data to quantify attention time during in-person meetings and attention time during remote meetings.

19. The computer implemented method of claim 1 further comprising using the pairwise adjacency matrix to perform any of: workspace planning, diversity and inclusion programs, workload assessment, collaboration and delivery improvement, teamwork and engagement improvement, and regulatory and compliance risk evaluation.

20. The computer implemented method of claim 1 further comprising determining any of: a clusteredness index, a siloness index, and a critical adjacency index.

* * * * *